(12) United States Patent
Hoban et al.

(10) Patent No.: US 10,927,939 B1
(45) Date of Patent: Feb. 23, 2021

(54) DAMPED MOTORCYCLE PRIMARY DRIVE SPROCKET SYSTEM WITH DAMPERS

(71) Applicant: Dark Horse Products, LLC

(72) Inventors: Thomas F. Hoban, Valders, WI (US); John E. Dahmer, Kiel, WI (US); John J. Prettie, Plymouth, WI (US)

(73) Assignee: Dark Horse Products, LLC, Newton, WI (US)

( * ) Notice: Subject to any disclaimer, the term of this patent is extended or adjusted under 35 U.S.C. 154(b) by 466 days.

(21) Appl. No.: 15/959,597

(22) Filed: Apr. 23, 2018

Related U.S. Application Data

(63) Continuation-in-part of application No. 15/144,208, filed on May 2, 2016, now abandoned, and a continuation-in-part of application No. 14/160,140, filed on Jan. 21, 2014, now abandoned.

(60) Provisional application No. 62/156,394, filed on May 4, 2015, provisional application No. 61/755,638, filed on Jan. 23, 2013.

(51) Int. Cl.
| | |
|---|---|
| *F16H 55/30* | (2006.01) |
| *F16H 55/14* | (2006.01) |
| *F16D 3/12* | (2006.01) |
| *F16F 15/124* | (2006.01) |
| *F16F 15/123* | (2006.01) |
| *F16D 3/70* | (2006.01) |

(52) U.S. Cl.
CPC ............ *F16H 55/30* (2013.01); *F16D 3/12* (2013.01); *F16D 3/70* (2013.01); *F16F 15/124* (2013.01); *F16F 15/12353* (2013.01); *F16H 55/14* (2013.01); *F16H 2055/306* (2013.01)

(58) Field of Classification Search
CPC .... F16H 55/30; F16H 55/14; F16H 2055/306; F16H 2055/336; F16D 3/12; F16D 3/68; F16D 3/70; F16F 15/12353; F16F 15/124
See application file for complete search history.

(56) References Cited

U.S. PATENT DOCUMENTS

| | | | | |
|---|---|---|---|---|
| 3,257,860 | A | * 6/1966 | Runde | F16H 55/30 474/94 |
| 4,328,879 | A | * 5/1982 | Tone | B62M 9/00 180/219 |
| 5,795,231 | A | 8/1998 | Fukuda | |
| 6,234,127 | B1 | 5/2001 | Simpson et al. | |
| 7,143,734 | B1 | 12/2006 | Leppanen et al. | |
| 7,682,255 | B2 | 3/2010 | Monis et al. | |

(Continued)

*Primary Examiner* — Michael R Mansen
*Assistant Examiner* — Robert T Reese
(74) *Attorney, Agent, or Firm* — Boyle Fredrickson, S.C.

(57) ABSTRACT

A damped primary drive sprocket system is provided that may be directly driven by a motorcycle engine and may be arranged in a primary drive connecting the motorcycle engine to a motorcycle transmission. The damped primary drive sprocket system may include damper segments such as discrete isolator bushings arranged in leading and trailing slot chambers, on opposite sides of a lug within a slot of a coupling system that connects a hub to a sprocket within the damped primary drive sprocket system. The slot chambers may be circular in cross-sectional perimeter shape so and the isolator bushings may be cylindrical and fit snugly in the slot chambers in a manner that damps slight rotational clocking movements of the hub and sprocket with respect to each other during firing pulses of the motorcycle engine.

7 Claims, 27 Drawing Sheets

(56) References Cited

U.S. PATENT DOCUMENTS

| | | | |
|---|---|---|---|
| 7,931,538 B2* | 4/2011 | Martinek | F16F 15/124 |
| | | | 464/73 |
| 8,070,632 B2 | 12/2011 | Yuan | |
| 8,920,271 B2 | 12/2014 | Burke | |
| 2007/0021249 A1* | 1/2007 | Shao | F16H 55/30 |
| | | | 474/94 |
| 2007/0049378 A1* | 3/2007 | Henderson | F16D 3/68 |
| | | | 464/76 |
| 2008/0283322 A1* | 11/2008 | Gruber | F16H 55/14 |
| | | | 180/219 |
| 2012/0135830 A1* | 5/2012 | Burke | B62M 9/02 |
| | | | 474/94 |
| 2015/0316138 A1 | 11/2015 | Dell et al. | |

* cited by examiner

DAMPED MOTORCYCLE PRIMARY DRIVE SPROCKET SYSTEM WITH DAMPERS

CROSS-REFERENCE TO RELATED APPLICATION

This application is a continuation-in-part of U.S. application Ser. No. 15/144,208 filed May 2, 2016, which claims the benefit of U.S. Provisional Patent App. No. 62/156,394, filed on May 4, 2015; and U.S. application Ser. No. 15/144,208 is a continuation-in-part of U.S. application Ser. No. 14/160,140 filed Jan. 21, 2014, which claims the benefit of U.S. Provisional Patent App. No. 61/755,638 filed Jan. 23, 2013, the entirety of each of which is expressly incorporated by reference herein for all purposes.

FIELD OF THE INVENTION

The present invention relates generally to motorcycle powertrains and, more specifically, to primary drives that transmit power between motorcycle engines and transmissions.

BACKGROUND OF THE INVENTION

Primary drives are used in motorcycles that have separate engines and transmissions. A chain or belt of the primary drive connects the engine with a clutch that transmits power to the transmission. Compensator systems are known that include compensator bases and compensator sprockets that have cooperating ramped fingers that engage each other to allow the base and sprocket to be rotatable with respect to each other in a manner that translates relative rotational movement of the base and sprocket into axial movement with respect to each other. The axial movement of the base and sprocket with respect to each other is resisted by axially arranged compression coil springs or Belville washer-type springs that compress so as to damp the axial and relative rotational movement of the base and sprocket with respect to each other, which damps transmission of engine firing pulses through the primary drive.

SUMMARY OF THE INVENTION

The present invention is directed to a damped primary drive sprocket system for a motorcycle primary drive connecting a motorcycle engine to a motorcycle transmission for reducing transmission of engine pulses through a motorcycle drivetrain by absorbing torsional and/or other vibrations from impulses such as engine firing pulses of the motorcycle engine with isolator bushings that cushion the engagement of components of the damped primary drive sprocket system. This allows for a relatively quiet, low vibration, and long-lasting primary drive, even when used with high horsepower motorcycle engines, without requiring axial movement of components of the damped primary drive sprocket system relative to other components.

According to one aspect of the invention, the damped primary drive sprocket system is directly driven by a motorcycle engine and may be arranged in a primary drive connecting the motorcycle engine to a motorcycle transmission. The damped primary drive sprocket system may include isolator bushings arranged in front of and behind lugs of an engine driven hub in openings of sprocket slots.

According to another aspect of the invention, damper segments, such as discrete isolator bushings arranged in leading and trailing slot chambers, are on opposite sides of a lug within a slot of a coupling system that connects a hub to a sprocket within the damped primary drive sprocket system. The slot chambers may each have a circular cross-sectional perimeter shape so a cylindrical isolator bushing may fit snugly in each slot chamber in a manner that damps slight rotational clocking movements of the hub and sprocket with respect to each other during firing pulses of the motorcycle engine.

According to another aspect of the invention, the damped primary drive sprocket system includes a hub that engages and is rotationally driven by an output shaft of a motorcycle engine rotating in a direction of rotation. The hub defines a central axis and has a hub base with multiple lugs that extend from it. The lugs are spaced from each other and arranged parallel to the central axis of the hub. A sprocket receives torque from the hub and defines a central axis that is aligned with the central axis of the hub. The sprocket may have teeth at its outer circumferential surface for driving a chain or belt to transmit torque from the damped primary drive sprocket system to a clutch that delivers torque to the motorcycle transmission. The sprocket has openings, which may be sprocket slots that receive the hub lugs for transmitting torque from the hub to the sprocket. The lug in each sprocket slot separates the slot into a leading slot chamber facing toward or in a leading position with respect to the direction of rotation of the output shaft of the motorcycle engine and a trailing slot chamber facing away from or in a trailing position with respect to the direction of rotation of the output shaft of the motorcycle engine. A damping system transmits torque between the sprocket and hub while absorbing vibrations such as torsional impulses like those induced by engine firing pulses. The damping system includes a leading damper segment that is arranged in the leading slot chamber(s), and a trailing damper segment is arranged in the trailing slot chamber(s) of the sprockets slot(s).

According to another aspect of the invention, the leading and trailing damper segments may be defined by discrete dampers and the discrete dampers may be implemented as isolator bushings. Each isolator bushing may have a cylindrical body with a longitudinal axis that is arranged parallel to the central axis of the hub.

According to another aspect of the invention, a first pair of walls defined by the slot leading end wall and the lug leading end wall may define the leading slot chamber. A second pair of walls defined by the slot trailing end wall and the lug trailing end wall may define the trailing slot chamber. These first and second pairs of walls may define curved openings of the respective leading and trailing slot chambers that receive the leading and trailing damper segments. The leading and/or trailing slot chamber(s) may define a substantially circular perimeter shape defined by curved wall segments when viewed in a transverse cross-section through the damped primary drive sprocket system. An outer circumferential surface of the isolator bushing cylindrical body engages the curved wall segments of the at least one of the leading and trailing slot chambers.

According to another aspect of the invention, each lug may have inner and outer lug segments, which may be radially defined respectively near to and farther from the hub central axis. A lug waist segment may be defined between the lug inner and outer segments. The lug waist segment is a middle or intermediate portion of the lug that may be narrower than at least one of the lug inner and outer segments. The lug waist segment may be narrower than each of the lug inner and outer segments, which may provide an hourglass-type perimeter shape to the lug. Each of the lug leading and trailing walls may be curved to present concave surfaces respectively facing toward and away from the direction of rotation of the output shaft of the motorcycle engine. These curved walls may be configured to cup and engage part(s) of the isolator bushings.

According to another aspect of the invention, the damped primary drive sprocket system includes a hub engaging and rotationally driven by an output shaft of a motorcycle engine rotating in a direction of rotation and a sprocket arranged to receive torque from the hub. A coupling system provides a lug and slot arrangement that rotationally connects the hub and sprocket to each other and is configured to permit rotational clocking movements of the hub and sprocket with respect to each other during firing pulses of the motorcycle engine. A damping system is arranged between the hub and sprocket, which damps the rotational clocking movements of the hub and sprocket and corresponding torsional vibrations with respect to each other during firing pulses of the motorcycle engine. The lug and slot arrangement may be defined by lugs that have inner and outer lug surfaces that face toward inner and outer slot surfaces, which may be separated or spaced from each other by a slight clearance, for example, about less than about $20/1000$ of an inch or about $10/1000$ of an inch, such as $5/1000$ of an inch radially inside and radially outside. This may radially locate and maintain axial alignment of the hub and sprocket with respect to each other while permitting the lugs to advance and regress along lengths of the slots. This permits the rotational clocking movement of the hub and sprocket with respect to each other during firing pulses of the motorcycle engine while maintaining a fixed axial overall width of the hub and sprocket assemblage. The lug and slot arrangement may be defined by lugs of the hub that are received in slots of the sprocket, or the reverse male/female configuration or a combined male/female may be implemented.

Figure 1:
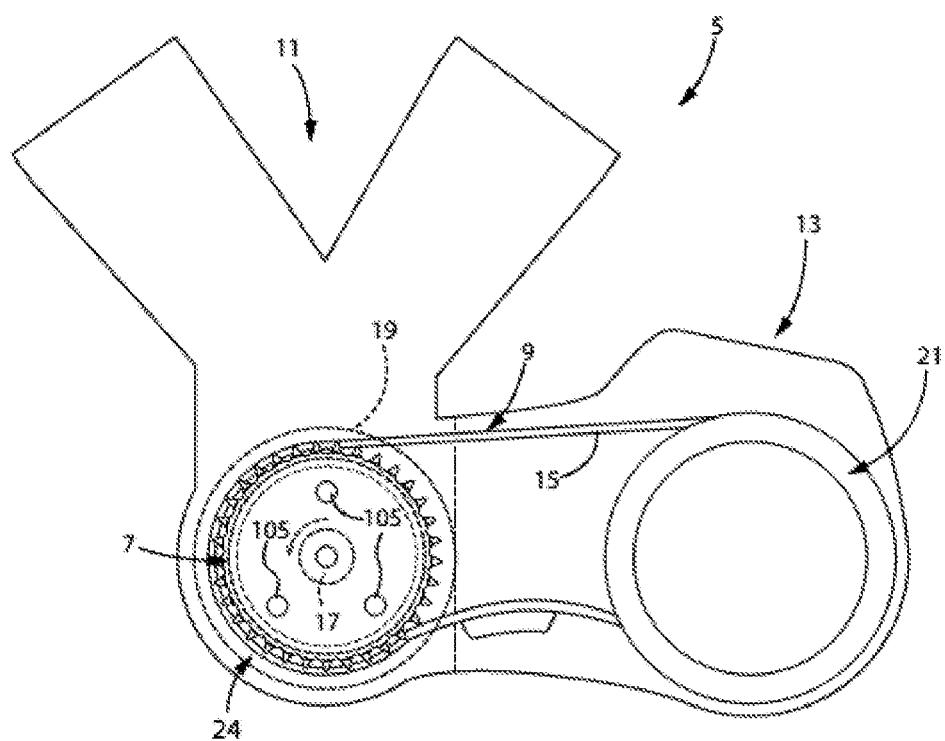
FIG. 1 is a simplified schematic representation of a portion of a motorcycle drivetrain incorporating a damped motorcycle primary drive sprocket system according to the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a simplified schematic representation of parts of a motorcycle drivetrain 5 is shown in which a damped motorcycle primary drive sprocket system, shown as system 7, is arranged in a primary drive 9 that connects a motorcycle engine 11 to a motorcycle transmission 13. Motorcycle engine 11 is schematically shown as being a V-twin common crankpin gasoline engine. A belt or chain, shown here as chain 15 delivers power from an output shaft 17 of a crank assembly 19 of the motorcycle engine 11 to a clutch 21 that is operably coupled to the motorcycle transmission 13. The system 7 is arranged so that it is directly driven by the output shaft 17, rotating in the same direction of rotation as the engine output shaft 17, while absorbing torsional and/or other vibrations from firing pulses of the motorcycle engine 11.

Figure 2:
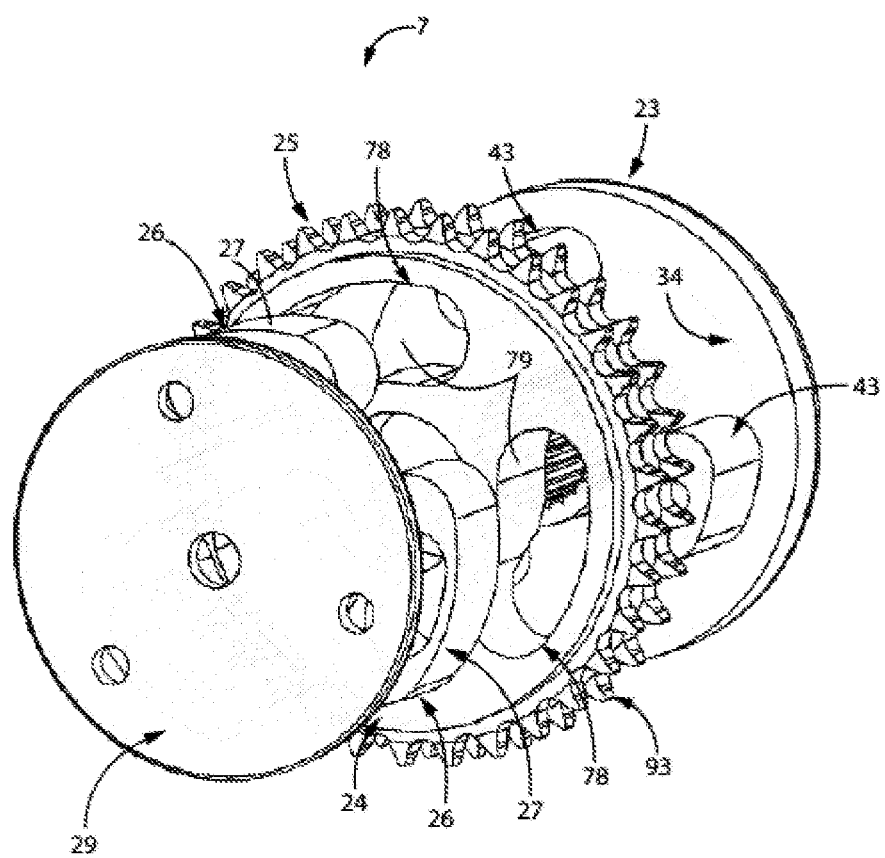
FIG. 2 is an exploded isometric view of the damped motorcycle primary drive sprocket system of FIG. 1.

Referring now to FIG. 2, the system 7 includes a hub 23 transmitting torque by way of damping system 24 to a sprocket 25 through intervening dampers 26 of damping system 24. Dampers 26 are shown here as isolation bushings or isolator bushings 27 that prevent metal-to-metal contact and cushion engagement between the hub 23 and sprocket 25 at the respective driving interface(s). A retaining plate 29 is arranged to maintain axial position of the isolator bushings 27 with respect to the hub 23 and sprocket 25, as is described in greater detail elsewhere herein.

Figure 3:
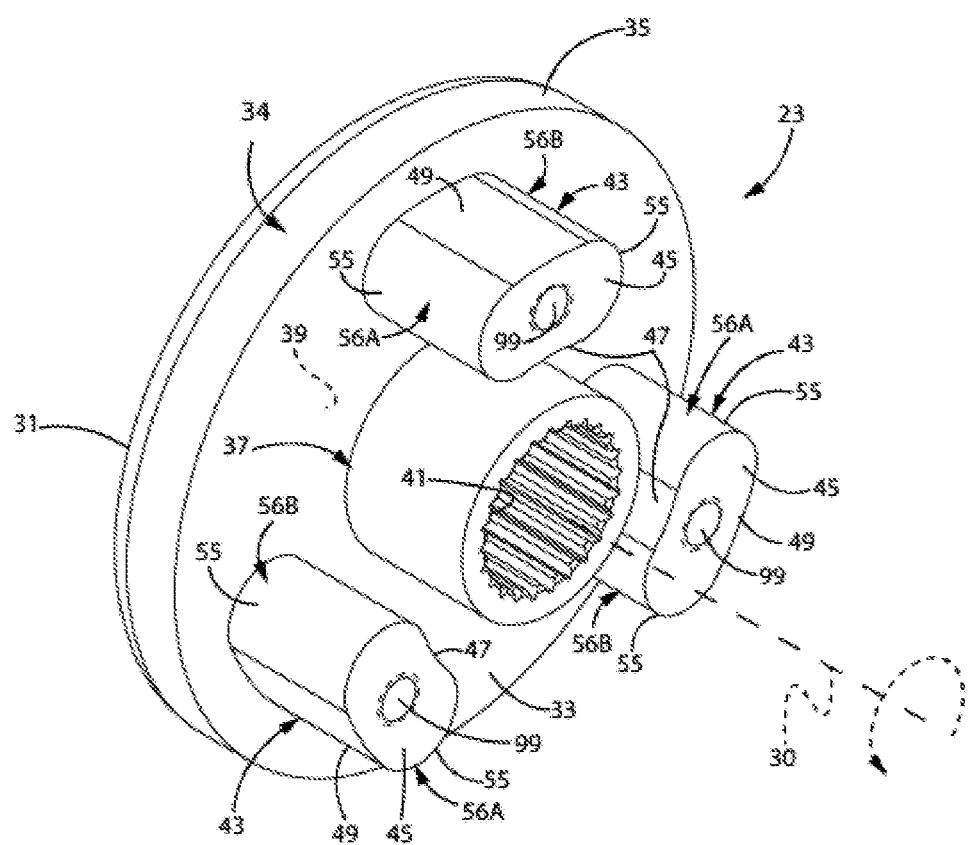
FIG. 3 is an isometric view of a hub of FIG. 1.
Figure 4:
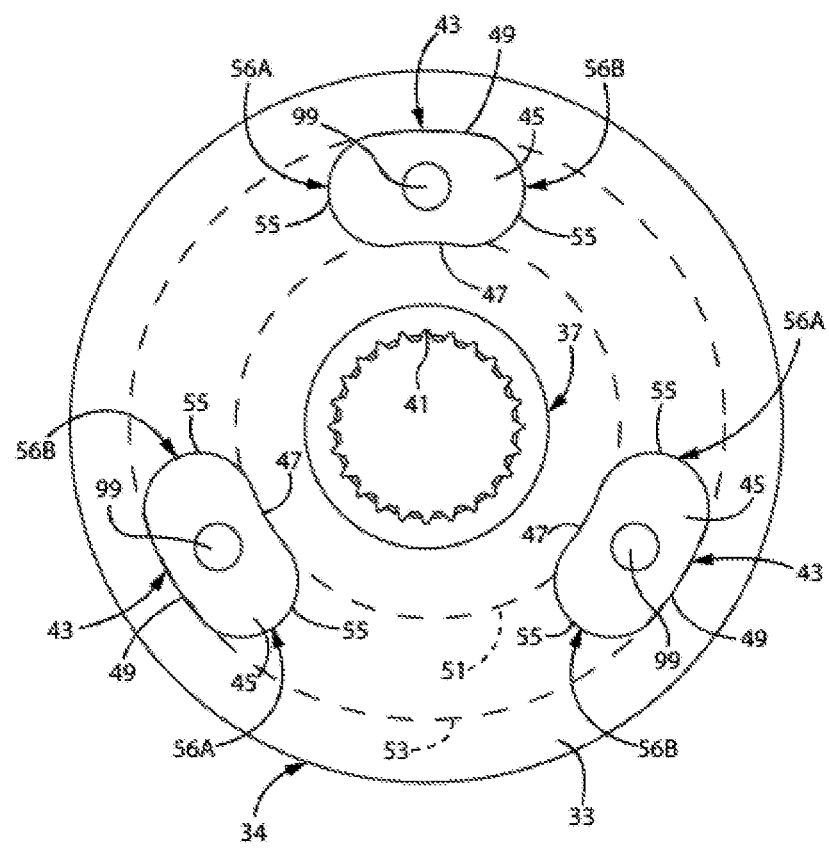
FIG. 4 is a front elevation view of the hub of FIG. 3.

Referring now to FIG. 3, the hub 23 defines a central axis 30 and has a hub inner face 31 facing toward the motorcycle engine 11 (FIG. 1) and a hub outer face 33 facing in the opposite direction on a hub base 34. Hub base 34 is shown here as providing a plate as a main body of the hub 23. A circumferential side wall 35 of the base 34 extends between and has a portion that tapers downwardly from the relatively larger diameter hub outer face 33 to the relatively smaller diameter hub inner face 31. A collar 37 extends axially away from a central portion 39 of the hub outer face 33. The collar 37 has a splined inner circumferential surface 41 that engages exterior splines (not shown) of the output shaft 17 (FIG. 1). At least two, and preferably three or more lugs 43, extend from the hub outer face 33. The lugs 43 are spaced from each other and arranged parallel to the central axis 30 of the hub 23. The lugs 43 define generally flat end surfaces 45 that face the same direction as the hub outer face 33. Referring to FIGS. 3 and 4, the lugs 43 include inner walls 47 arranged relatively nearer the hub central axis 30 (FIG. 3) and outer walls 49 arranged relatively farther from the hub central axis 30. The lug inner and outer walls 47, 49 in this embodiment are curved and are defined upon projected circles that are concentric with respect to each other, shown as the dashed-line circles 51, 53. The lugs 43 include end walls 55 connecting the inner and outer walls 47, 49 to each other. In this embodiment, the end walls 55 are continuously curve so as to define a U-shaped path extending between the inner and outer walls 47, 49. The inner and outer walls 47, 49 and the end walls 55, in combination, define an outer perimeter shape of the lug 43 that corresponds to an inner perimeter shape of the isolator bushings 27. The end walls 55 include a leading lug end wall 56A facing toward the direction of rotation of the hub 23 and engine output shaft 17 (FIG. 1), represented by the dashed curved arrow around central axis 30. Trailing lug end wall 56B faces away from the direction of rotation of the hub 23 and engine output shaft 17 (FIG. 1).

Figure 5:
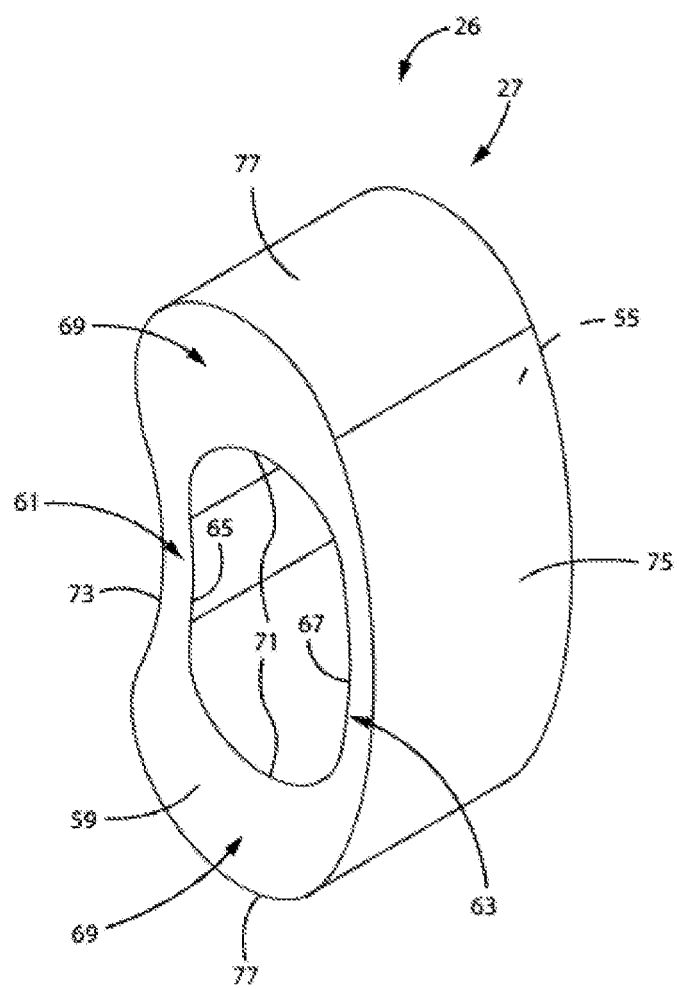
FIG. 5 is an isometric view of an isolator bushing of FIG. 1.
Figure 6:
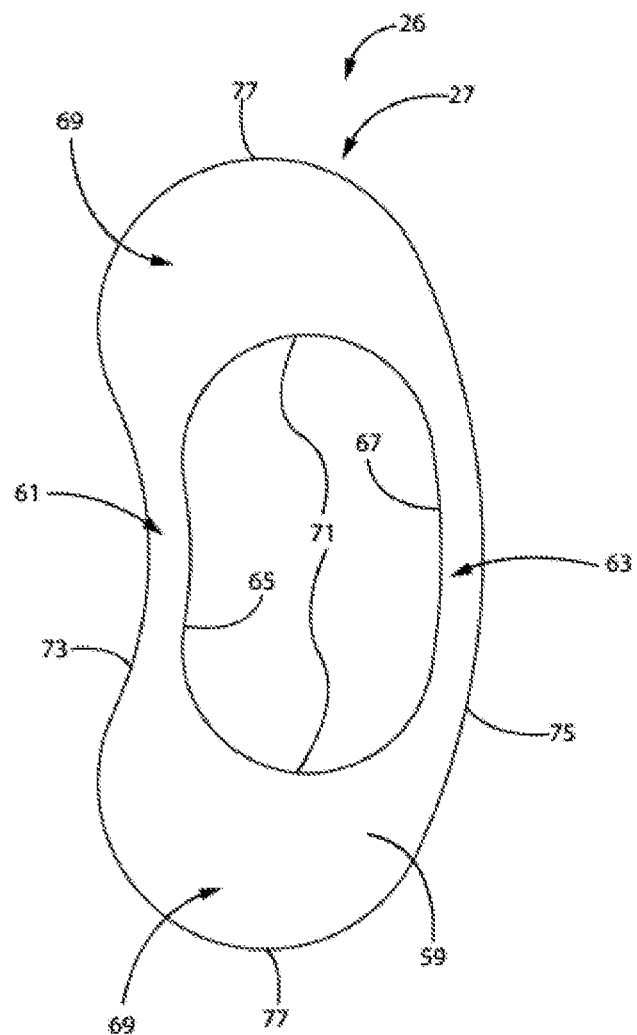
FIG. 6 is a front elevation view of the isolator bushing of FIG. 5.

Referring now to FIGS. 5 and 6, each isolator bushing 27 fits snugly over a respective one of the lugs 43 of the hub 23 (FIG. 2). The isolator bushings 27 are made from a durable material. In one embodiment, the isolator bushings 27 may be made from a polyurethane material having a durometer of about 60. Isolator bushing 27 has an inner generally flat surface 57 that abuts the hub outer face 33 (FIG. 3) and an outer generally flat surface 59 that faces an opposite direction. The isolator bushing 27 has inner and outer walls 61, 63 with inner surfaces 65, 67, respectively, which in this embodiment are curved and abut the inner and outer walls 47 and 49 of the lugs 43 (FIG. 4). End walls 69 extend between and connect the inner and outer walls 61, 63 with each other. The end walls 69 are thicker than the inner and outer walls 61, 63 and define end wall inner surfaces 71 that engage the end walls 55 of the lugs 43. The inner, outer, and end walls 61, 63, 69 define inner, outer, and end wall outer surfaces 73, 75, 77, respectively, that collectively define an outer perimeter shape of the isolator bushing 27 that corresponds to a perimeter shape of a slot 78 providing an opening(s) 79 within the sprocket 25 (FIG. 7).

Figure 7:
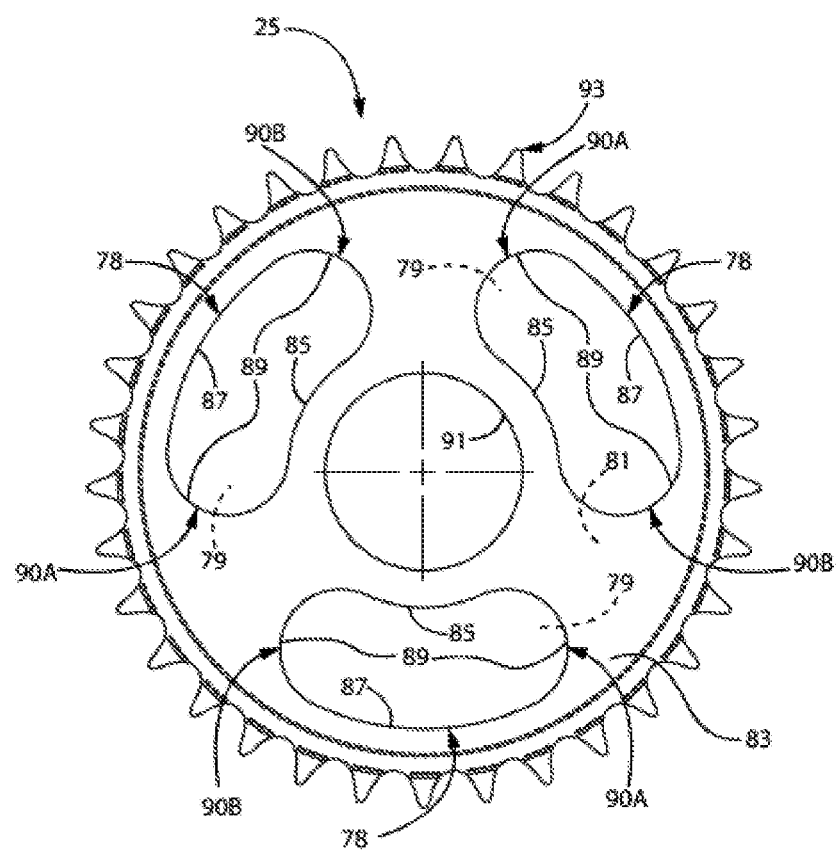
FIG. 7 is a front elevation view of a sprocket of FIG. 1.

Referring now to FIG. 7, the openings 79 of the slots 78 in sprocket 25 are sized to snuggly receive the isolator bushings 27 (FIG. 5). In one embodiment, the overall length and/or width dimensions of the isolator bushings 27 (FIG. 5) may be larger than the corresponding dimensions of the openings 79 to define an interference fit or press fit of the isolator bushings 27 into the opening 79. This may hold the isolator bushings 27 in a state of compression within the openings 79. The openings 79 extend between a sprocket inner surface 81 and oppositely-facing outer surface 83, facing toward the viewer of FIG. 7. The openings 79 of the slots 78 are defined between slot inner and outer walls 85, 87 and slot end walls 89 that interconnect the slot inner and outer walls 85, 87 and all of which are curved in this embodiment. Slot end walls 89 include a leading slot end wall 90A and a trailing slot end wall 90B respectively facing toward and away from the direction of rotation of the hub 23 (FIG. 3) and engine output shaft 17 (FIG. 1). The openings 79 of this embodiment are shown as passing entirely through the thickness of the sprocket 25. A central bore 91 extends through the sprocket 25 and concentrically receives the collar 37 of the hub 23 (FIG. 3). Sprocket 25 includes a toothed outer circumferential surface 93 for driving the chain 15 (FIG. 1) so as to deliver power to the clutch 21 (FIG. 1).

Figure 8:
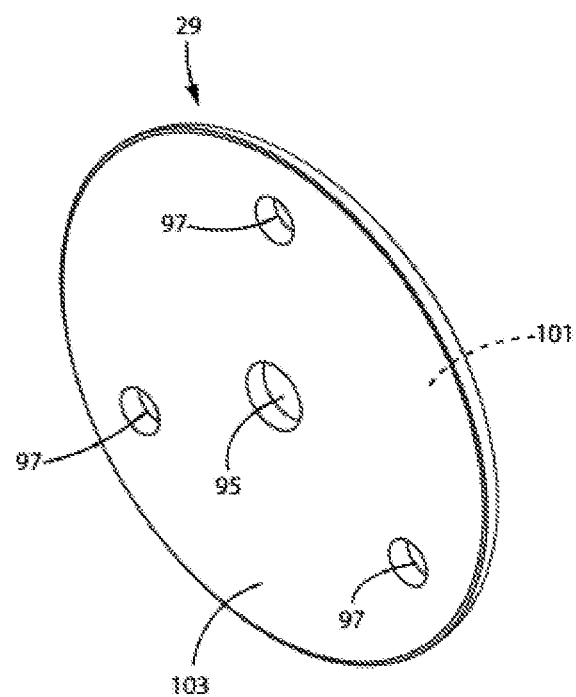
FIG. 8 is an isometric view of a retaining plate of FIG. 1.

Referring now to FIGS. 1 and 2, in the complete assemblage of the system 7, the generally flat outwardly-facing surfaces of the output shaft 17, collar 37, lugs 43, isolator bushings 27, and sprocket 25, in combination, define a substantially continuous flat circular surface. The retaining plate 29 is arranged to abut this substantially continuous flat circular surface that is collectively defined by such other components of the system 7. Referring now to FIG. 8, the retaining plate 29 includes a central bore 95 that aligns with a bore (not shown) in the output shaft 17 (FIG. 1) of the motorcycle engine 11. Outer bores 97 extend through the retaining plate 29, outwardly of the central bore 95 and spaced from each other. The outer bores 97 are aligned with bores 99 (FIG. 3) of the lugs 43. All of the central and outer bores 95, 97 are through bores that extend entirely through the thickness of the retaining plate 29, between inner and outer surfaces 101, 103 of the retaining plate 29. Fasteners, shown as bolts 105 (FIG. 1), extend through the central and outer bores 95, 97 and into the bores of the output shaft 17 (bore not shown) and bores 99 of the lugs 43 to secure the retaining plate 29 against the remainder of the system 7. In this way, the isolator bushings 27 are sandwiched axially between the hub 23 and the retaining plate 29 and occupy the space between the lugs 43 and the sprocket 25.

Figure 9:
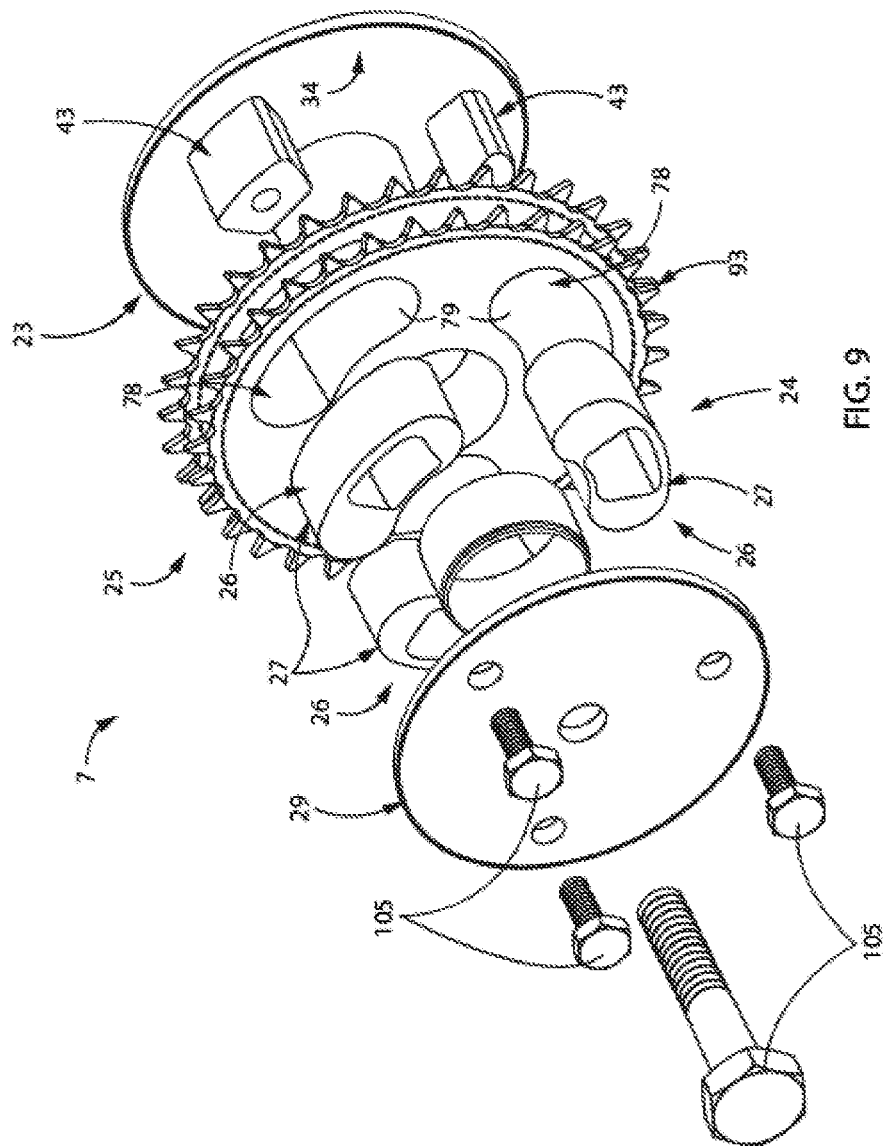
FIG. 9 is an exploded isometric view of a variant of the damped motorcycle primary drive sprocket system of FIG. 2.

Referring now to FIG. 9, the system 7 is mostly identical to the system 7 described with respect to FIG. 2, whereby such descriptions are applicable. The system 7 of FIG. 9 differs from that of FIG. 2 in that it includes relatively larger clearances between components or various portions of engaging components.

Figure 10:
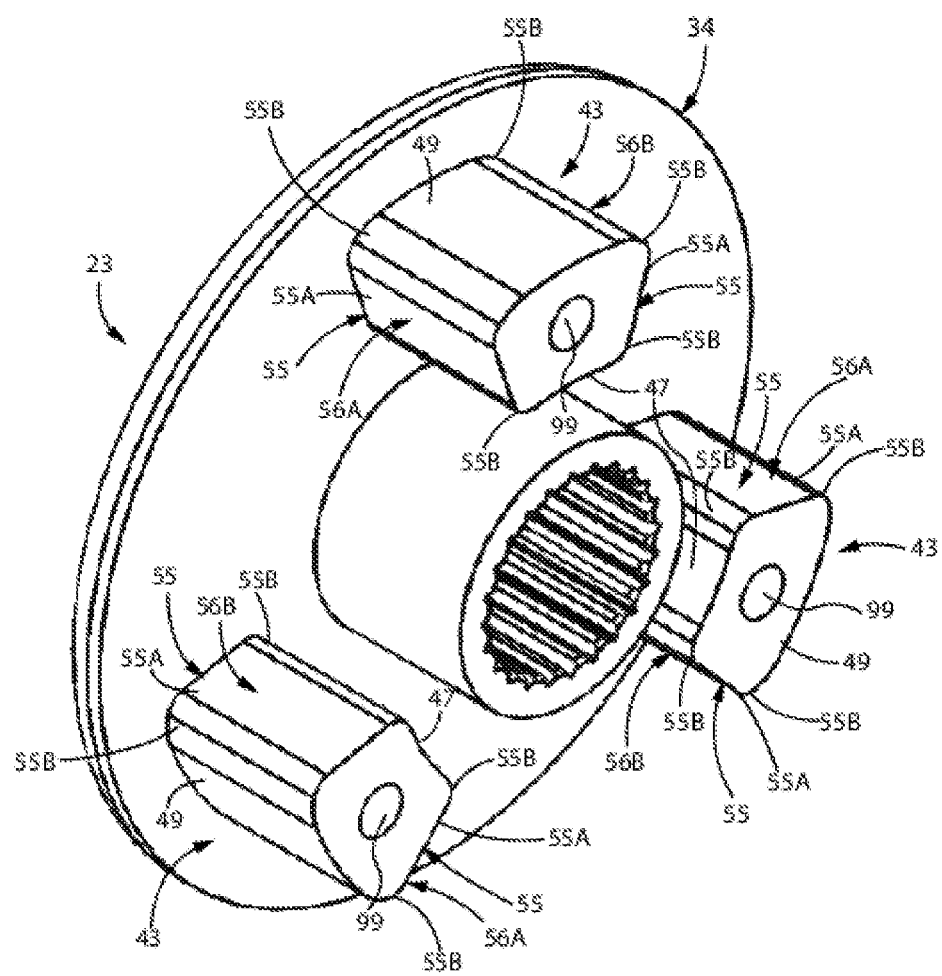
FIG. 10 is an isometric view of a hub of FIG. 9.

Referring now to FIG. 10, the hub 23 is mostly identical to the hub 23 described with respect to FIGS. 3-4, whereby such descriptions are applicable. The hub 23 of FIG. 10 differs from that in FIGS. 3-4 in that the end walls 55 of the lugs 43 do not curve continuously like those shown in FIGS. 3-4. Instead, hub 23 of FIG. 10 has lugs 43 with generally flat end walls or end walls 55 that define end wall intermediate segments 55A that are substantially flat and corner segments 55B that are curved.

Figure 11:
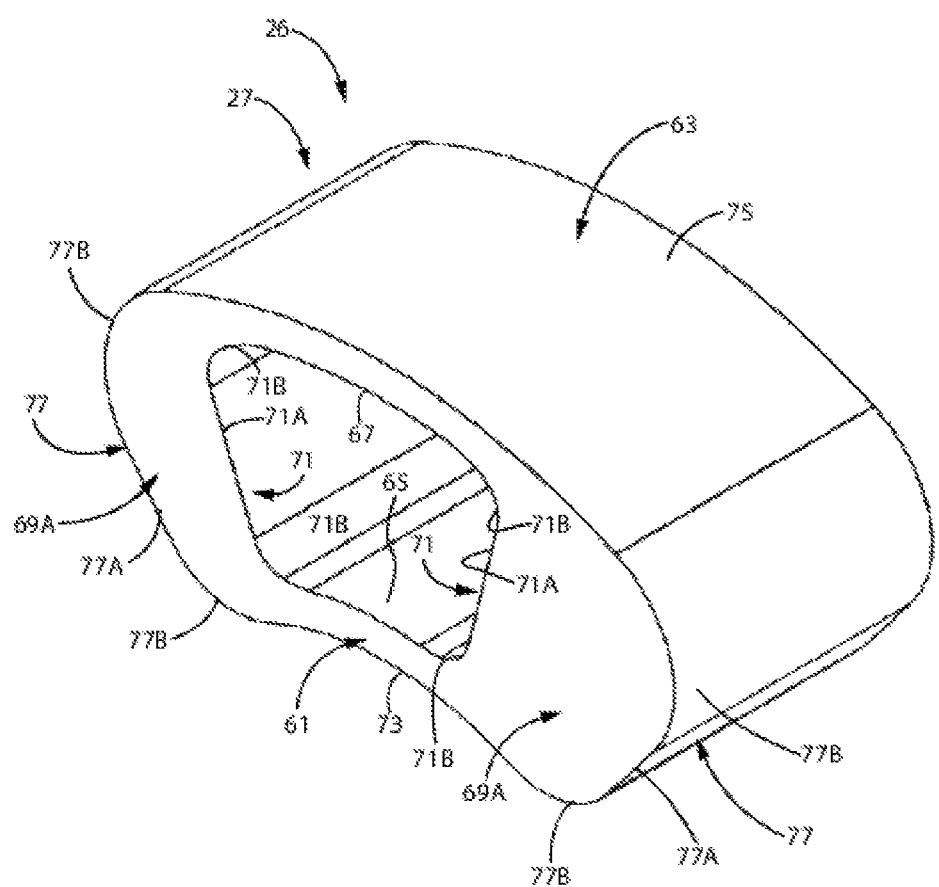
FIG. 11 is an isometric view of an isolator bushing of FIG. 9.

Referring now to FIG. 11, the isolator bushing 27 is mostly identical to the isolator bushing 27 described with respect to FIGS. 5-6, whereby such descriptions are applicable here. The isolator bushing 27 of FIG. 11 differs from that in FIGS. 5-6 in that the end walls 69A and 69B of FIG. 11 have different thicknesses, unlike the end walls 69 of FIGS. 5-6. End wall 69A is thicker than the end wall 69B and is arranged facing a direction of rotation of the hub 23 and thus the output shaft 17 of the crank assembly 19 (FIG. 1). The isolator bushing 27 of FIG. 11 also differs from that in FIGS. 5-6 in that the end walls 69A, 69B do not curve continuously like the end walls 69 shown in FIGS. 5-6. The isolator bushing 27 of FIG. 11 also differs from that in FIGS. 5-6 in that the end walls 69A and 69B of FIG. 11 have end wall inner surfaces 71 which define end wall inner surface intermediate segments 71A that are substantially flat and end wall inner surface corner segments 71B that are curved. Each of the end walls 69A, 69B has an end wall outer surface 77 that defines an end wall outer surface intermediate segment 77A that is substantially flat and end wall outer surface corner segments 77B that are curved.

Figure 12:
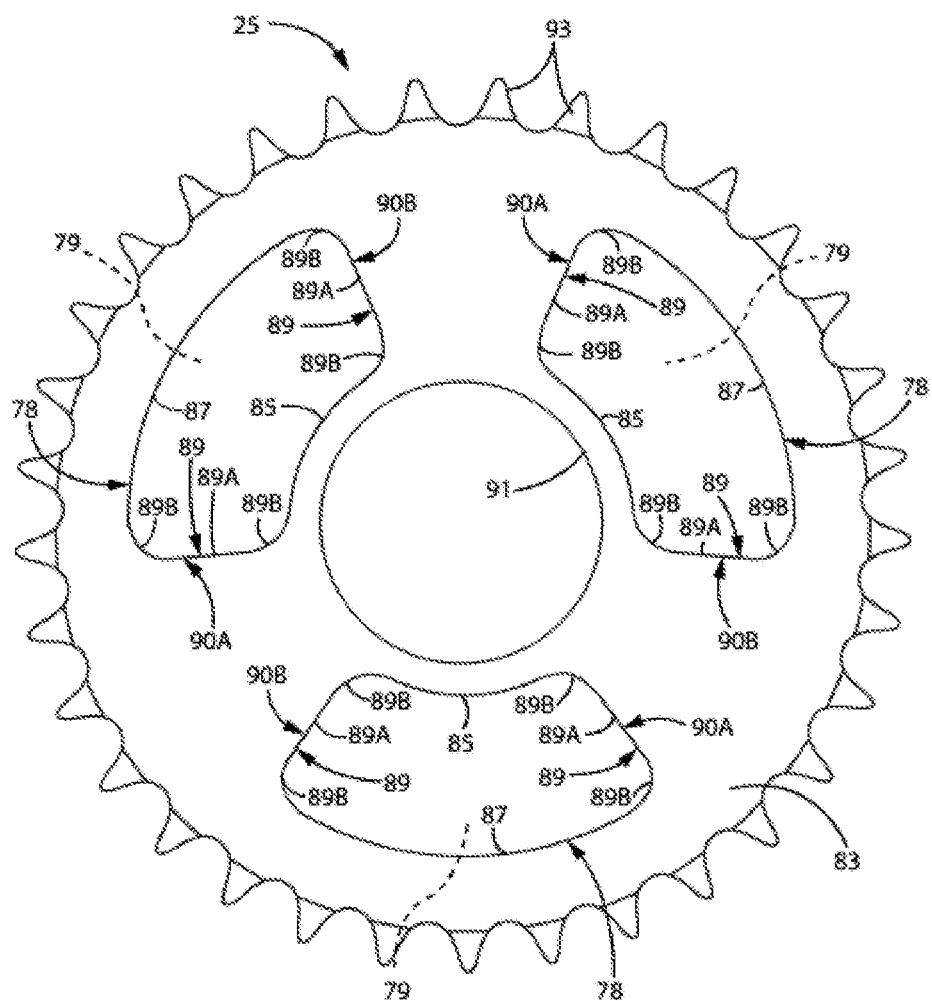
FIG. 12 is a front elevation view of the sprocket of FIG. 9.

Referring now to FIG. 12, the sprocket 25 is mostly identical to the sprocket 25 described with respect to FIG. 7, whereby such descriptions are applicable here. The sprocket 25 of FIG. 12 differs from that in FIG. 7 in that the end walls 89 do not curve continuously like those shown in FIG. 7. Instead, the sprocket 25 of FIG. 12 has end walls 89 that define end wall intermediate segments 89A that are substantially flat and corner segments 89B that are curved.

Figure 13:
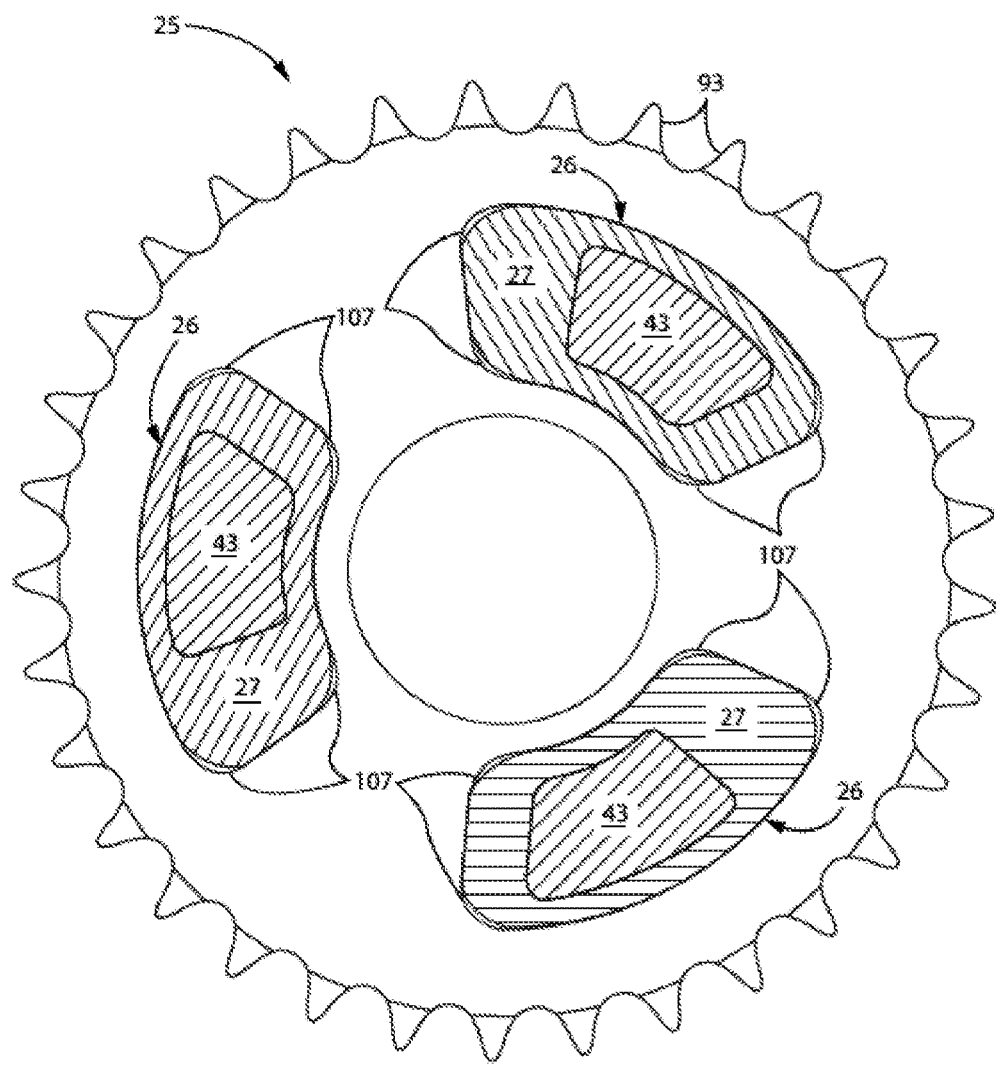
FIG. 13 is another front elevation view of the sprocket of FIG. 9.

Referring now to FIG. 13, in this embodiment, the isolator bushings 27 and the lugs 43 engage each other continuously through their respective interfacing surfaces, while clearances 107 are defined between the isolator bushings 27 and the sprocket 25. The clearances 107 are sized to accommodate material of the isolator bushings 27 that may move during deformation of the isolator bushings 27 while absorbing torsional and/or other vibrations from engine firing pulses. Referring now to FIGS. 11-13, the clearances 107 (FIG. 13) are defined between the outer surface corner segments 77B of the isolator bushing 27 (FIG. 11) and the corresponding corner segments 89B of the end walls 89 of the sprocket 25 (FIG. 12). In this embodiment, the outer surface corner segments 77B of the isolator bushing 27 (FIG. 11) have larger radii of curvature than the corner segments 89B of the end walls 89 of the sprocket 25 (FIG. 12) such that the clearances 107 define generally crescent-shaped spaces between the isolator bushings 27 and the sprocket 25. In one embodiment, the overall length and/or width dimensions of the overall length, such as a length defined between the flat intermediate segments 77A (FIG. 11), and/or width dimensions, such as a width defined between the inner and outer surfaces 73, 75 of the isolator bushings 27 may be larger than the corresponding dimensions of the openings 79, such as respective distances between the flat end wall intermediate segments 89A and the inner and outer walls 85, 87. In this embodiment, the oversized isolator bushings 27 define an interference fit or press fit of the isolator bushings 27 into the openings 79. This may hold the isolator bushings 27 in a state of compression within the openings 79.

Figure 14:
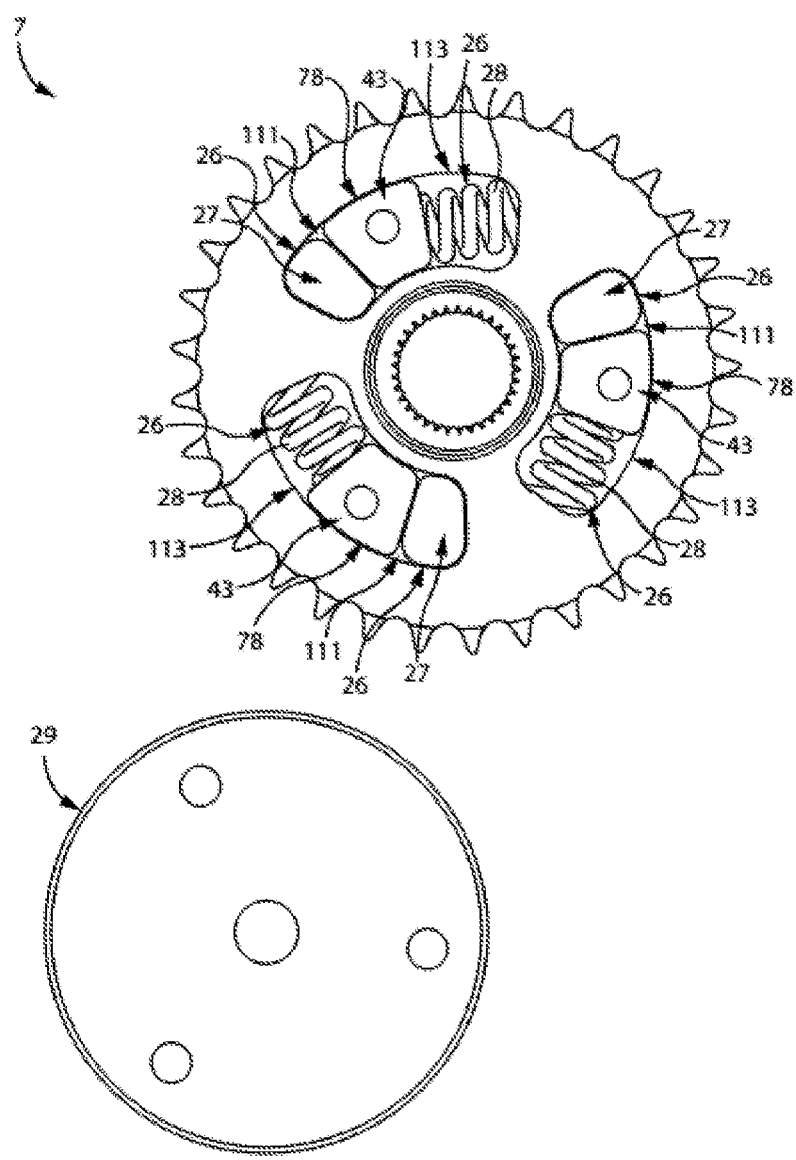
FIG. 14 is a front elevation view of another variant of the damped motorcycle primary drive sprocket system of FIG. 2.

Referring now to FIG. 14, the system 7 is mostly identical to the system 7 described with respect to FIGS. 2 and 9, whereby such descriptions are applicable. The system 7 of FIG. 14 differs from those of FIGS. 2 and 9 in that system 7 of FIG. 14 includes two dampers 26 made from different materials on opposite sides of each lug 43, instead of a single damper 26 encapsulating or surrounding each lug 43 as shown FIGS. 2 and 9. Each slot 79 is separated by its respective lug 43 into a leading slot chamber 111 and a trailing slot chamber 113 respectively facing toward and away from the direction of rotation of the hub 23 (FIG. 3) and engine output shaft 17 (FIG. 1). The damper 26 in front of or leading the lug 43 is shown here as isolator bushing 27 within the leading slot chamber 111. Isolator bushing 27 is made from a resilient material such as rubber and is configured to compress in the direction of rotation of the hub 23 (FIG. 3) to cushion pulsed advances of the hub 23 relative to sprocket 25 corresponding to firing pulses of engine 11 (FIG. 1). The damper 26 in back of or trailing the lug 43 is shown here as a biasing device such as spring 28 within the trailing slot chamber 113. Spring 28 is configured to urge the lug 43 toward the isolator bushing 27, such as by urging a rotational bias of the sprocket 25 opposite the direction of rotation of the hub 23 (FIG. 3) and engine output shaft 17 (FIG. 1).

Figure 15:
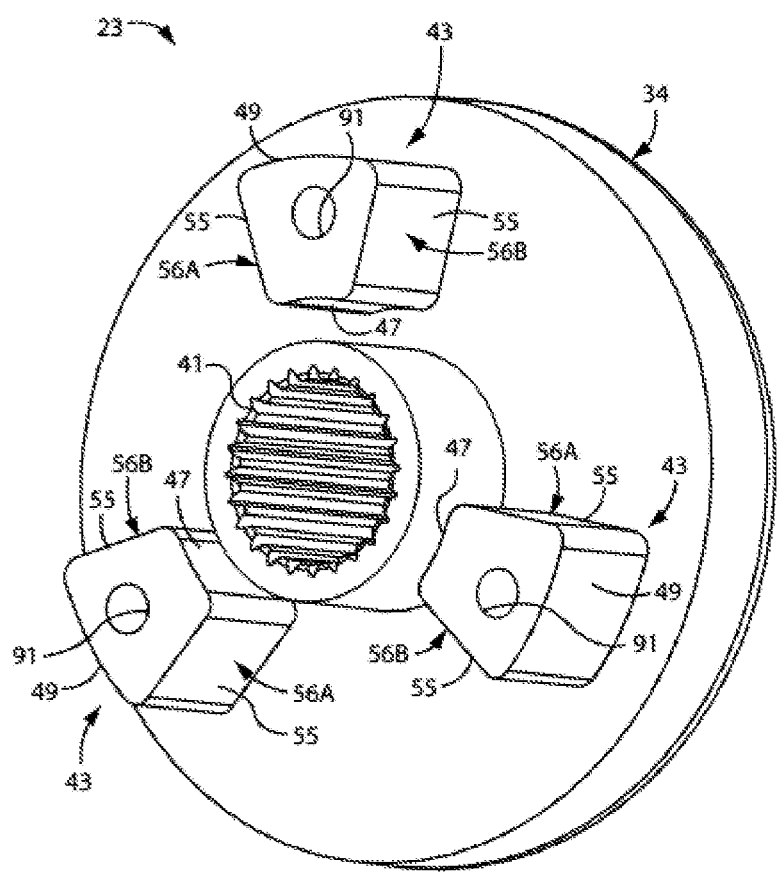
FIG. 15 is an isometric view of a hub of FIG. 14.

Referring now to FIG. 15, the hub 23 is mostly identical to the hub 23 described with respect to FIGS. 3-4 and 10, whereby such descriptions are applicable. The hub 23 of FIG. 15 is similar to hub 23 of FIG. 10 and differs from that in FIGS. 3-4 in that the end walls 55 in FIG. 15 of the lugs 43 do not curve continuously like those shown in FIGS. 3-4. Instead, like in FIG. 10, hub 23 of FIG. 15 has lugs 43 with generally flat end walls 55 defining the leading and trailing lug end walls 56A, 56B respectively facing toward and away from the direction of rotation of hub 23 (FIG. 3) and engine output shaft 17 (FIG. 1). The lugs 43 of FIG. 15 are narrower than the lugs 43 of FIG. 10 and the bores 99 of the lugs 43 of FIG. 15 are arranged closer to the lug outer walls 49 than those of FIG. 10. The lugs 43 glide directly against the slots 78, with the lug inner walls 47 sliding against the slot inner walls 85 (FIG. 16) and the lug outer walls 49 sliding against the slot outer walls 87 (FIG. 16).

Figure 16:
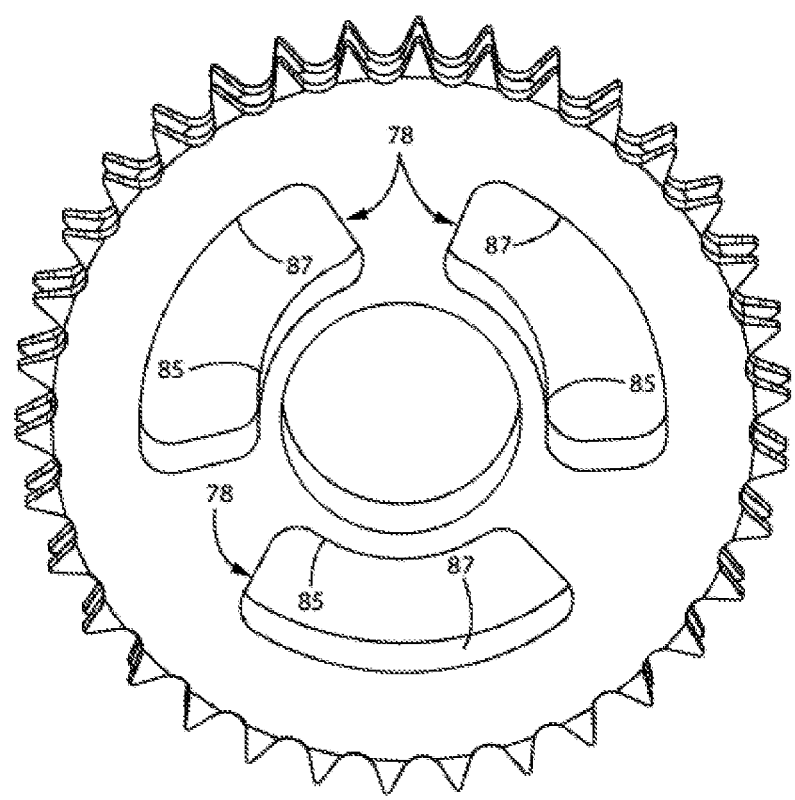
FIG. 16 is an isometric view of a sprocket of FIG. 14.

Referring now to FIG. 16, the sprocket 25 is mostly identical to the sprocket 25 described with respect to FIGS. 7 and 12, whereby such descriptions are applicable. The sprocket 25 of FIG. 16 is similar to sprocket 25 of FIG. 12 and differs from that in FIG. 7 in that the end walls 89 do not curve continuously like those shown in FIG. 7. Instead, like in FIG. 12, the sprocket 25 of FIG. 16 has flat slot end walls 89 defining the leading and trailing slot end walls 90A, 90B respectively facing toward and away from the direction of rotation of hub 23 (FIG. 3) and engine output shaft 17 (FIG. 1).

Figure 17:
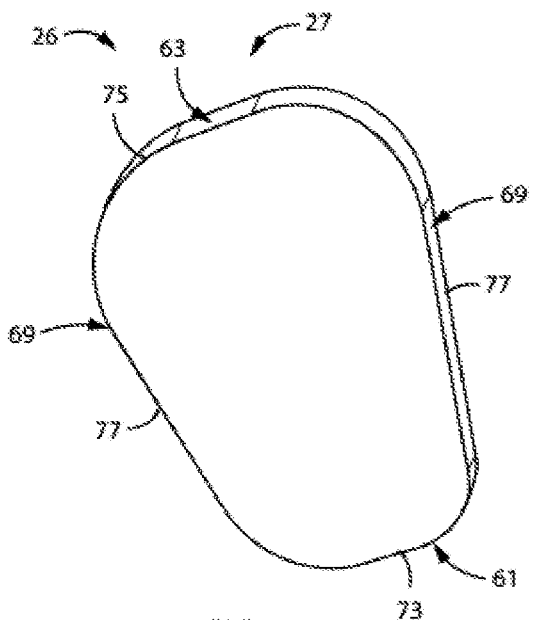
FIG. 17 is an isometric view of an isolator bushing of FIG. 14.

Referring now to FIG. 17, the isolator bushing 27 is mostly identical to the isolator bushings 27 described with respect to FIGS. 5-6 and 11, whereby such descriptions are applicable here. The isolator bushing 27 of FIG. 17 differs from those in FIGS. 5-6 and 11 in that it is smaller and solid, configured to be held in the leading slot chamber 111 (FIG. 14) in full face-to-face engagement with respective surfaces of the leading slot end wall 90A. The isolator bushing 27 is configured to nest within the leading slot chamber 111 without forward corner clearances 107, but instead with rearward corner clearances 107 between the isolator bushing 27 and the lug 43 (FIG. 14). This isolator bushing 27 has end walls 69 extending at angles with respect to each other, providing a slight tapering or wedge-shape profile that is wider toward the outer wall 63 and narrower toward the inner wall 61.

Figure 18:
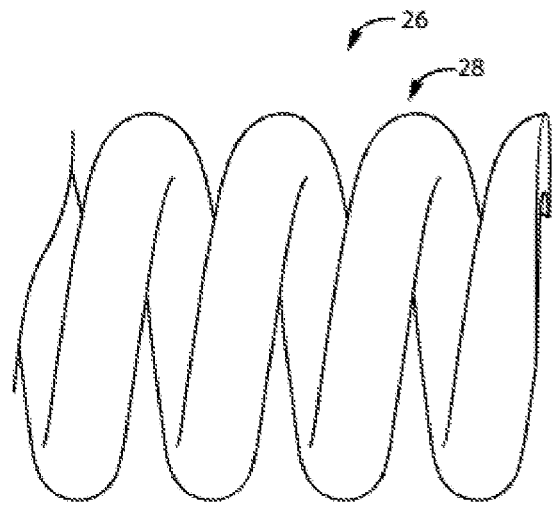
FIG. 18 is an isometric view of a spring of FIG. 14.

Referring now to FIG. 18, the spring 28 is shown as a compression spring. Referring to FIGS. 14 and 18, the spring is held in the trailing slot chamber 113 (FIG. 14) and arranged perpendicularly between the trailing lug end wall 56B (FIG. 15) and trailing slot end wall 90B (FIG. 16).

Figure 19:
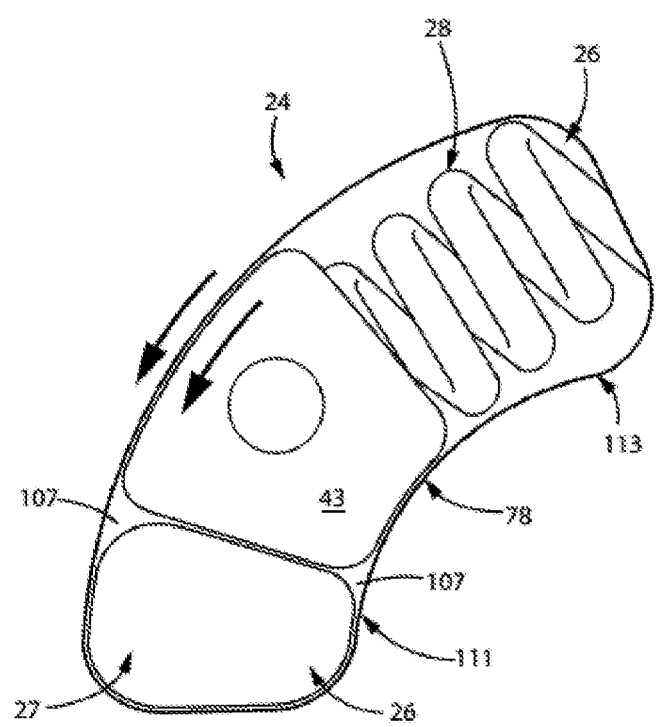
FIG. 19 is a simplified partially schematic view of parts of the system of FIG. 14.
Figure 20:
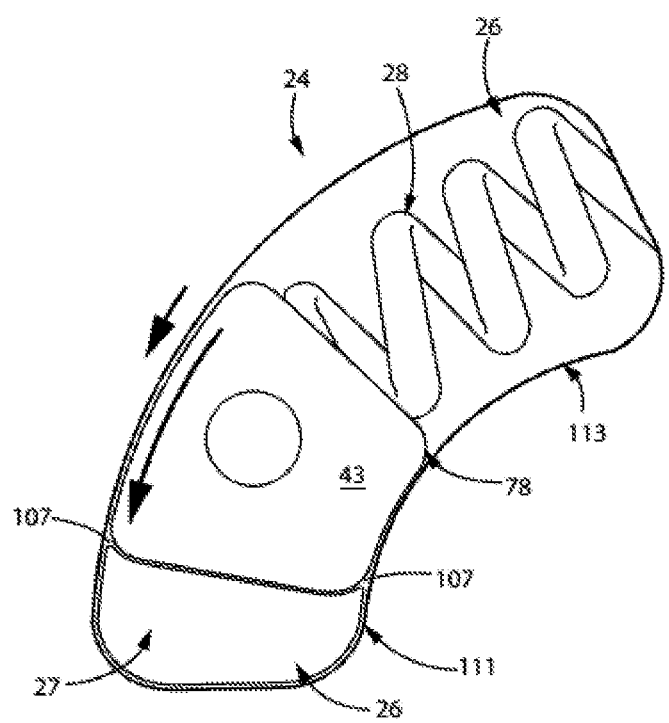
FIG. 20 is another simplified partially schematic view of parts of the system of FIG. 14.
Figure 21:
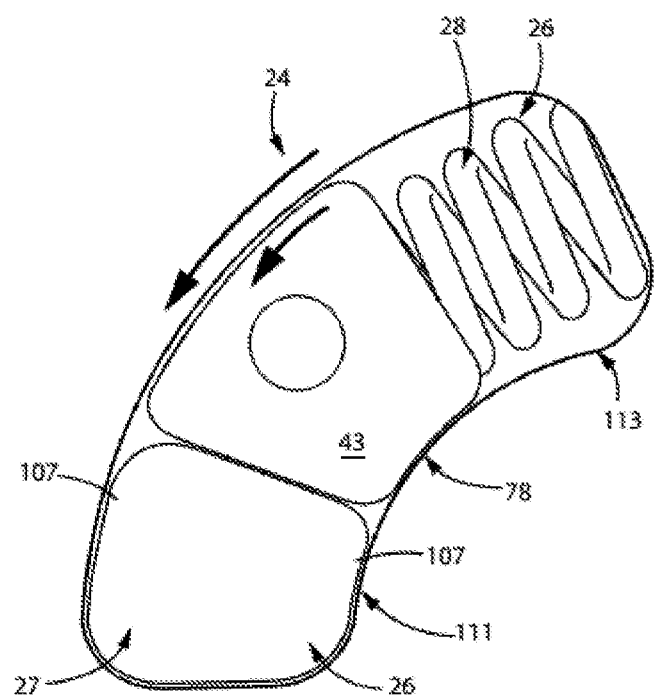
FIG. 21 is another simplified partially schematic view of parts of the system of FIG. 14.

Referring now to FIGS. 19-21, exaggerated relative positions of the isolator bushing 27, spring 28, and lug 43 are shown in simplified form during different states of engine rotation with respect to firing pulses that create torsional vibrations in components driven by the engine. In each of FIGS. 19-21, the parallel pair of arrows with one arrow on the lug 43 and the other outside of the slot 78 represent relative speeds of components at different times. The arrow on lug 43 represents the speed of the hub 23 and lug 43. The arrow outside the slots 78 represents the speed of the sprocket 25.

FIG. 19 shows a neutral state in which the hub 23 and sprocket 25 are traveling at the same speed. During the neutral state, the spring 28 biases the hub 23 and sprocket 25 with respect to each other to hold the lug 43 snugly against the isolator bushing 27 in a slightly loaded or compressed but stable state.

FIG. 20 shows a hub accelerating state which occurs during firing pulses of the engine. During the hub accelerating state, lug 43 accelerates and drives into the isolator bushing 27, which further compresses the isolator bushing 27 and deforms the isolator bushing 27 so that some of its material is displaced or flows into the clearances 107.

FIG. 21 shows a hub decelerating state which occurs immediately after a firing pulse of the engine. During the hub decelerating state, lug 43 decelerates for accelerates at a lesser rate than the sprocket 25 while the sprocket 25 and downstream rotating components may maintain their angular momentum, so that the isolator bushing 27 may pull slightly ahead of the lug 43. This allows the isolator bushing 27 to relax and elongate toward its resting state dimensions while the lug 43 pushes against spring 28, which compresses the spring 28 to increase the biasing force that holds the isolator bushing 27 and lug 43 against each other so that contact is maintained between the isolator bushing 27 and the front of the slot 78 and also the isolator bushing 27 and the lug 43, even when the sprocket 25 is trying to overrun the hub 23, preventing clatter or other vibrations within the system.

Figure 22:
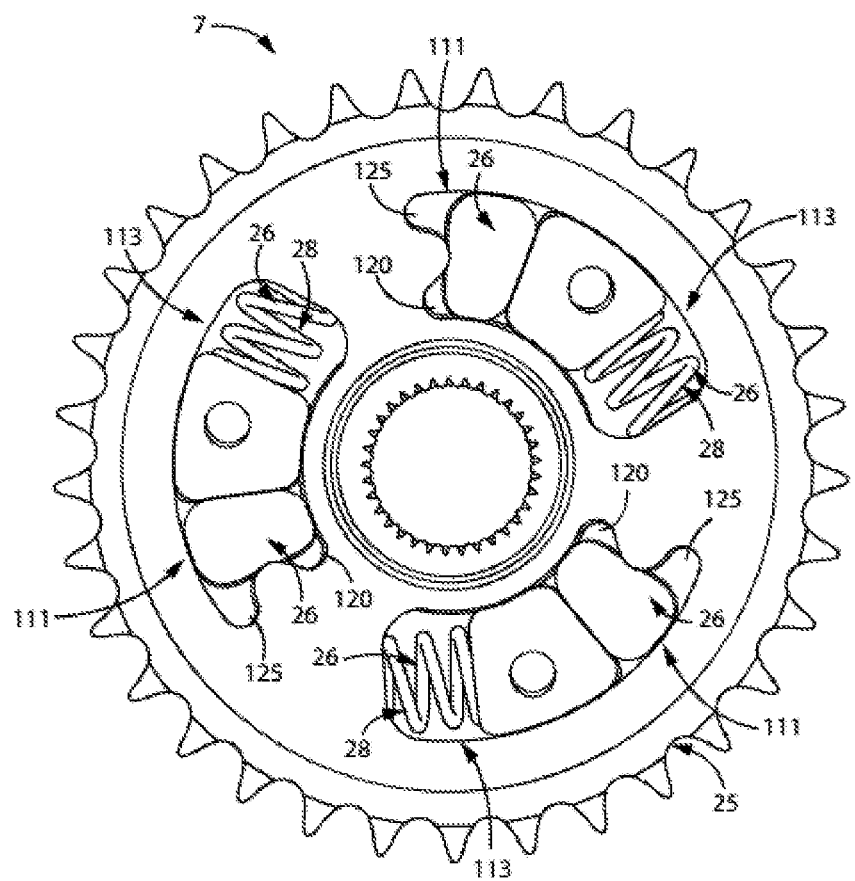
FIG. 22 is a front elevation view of another variant of the damped motorcycle primary drive sprocket system of FIG. 2.
Figure 23:
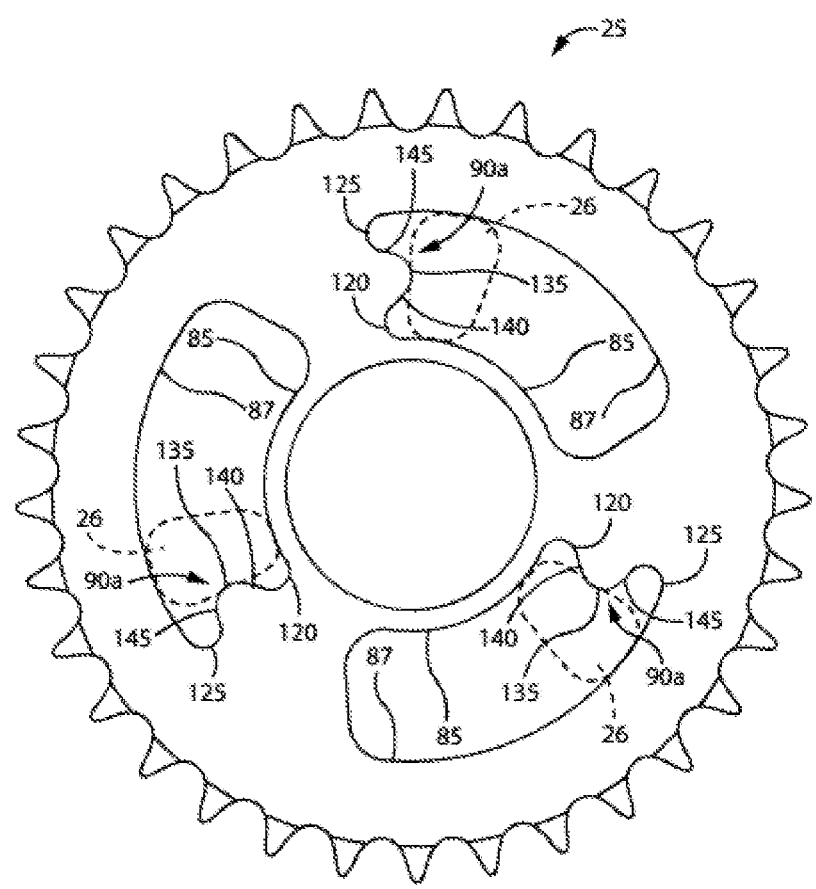
FIG. 23 is a front elevation view of the sprocket of FIG. 22.

FIGS. 22-23 show a system 7 and components that are mostly identical to the system 7 described with respect to FIGS. 2, 9, and 14 whereby such descriptions are applicable here. The system 7 of FIG. 22 differs from that of FIG. 14 in that system 7 of FIG. 22 has a leading slot chamber 111 with a forward and defining a pair of pockets shown as inner pocket 120 and outer pocket 125. Inner pocket 120 is arranged closer to an axis rotation and outer pocket 125 is spaced radially outward from the inner pocket 120, farther from the axis of rotation. Inner and outer pockets 120, 125 are configured to receive material from damper 26 during deformation of damper 26 while absorbing energy from firing pulses. Referring now to FIG. 23, sprocket 25 includes leading wall 90A with projection 130 extending inwardly from an intermediate portion of leading wall 90A. Projection 130 has a curved profile presenting a convex bump that extends toward the damper 26 with a tip end 135 defining an apex of the projection 130 and inner and outer side segments 140, 145 extending from tip end 135, curving three transition that connects to slot inner and outer walls 85, 87. Tip end 135 presents the initial engagement surface touching the damper 26, concentrating forces at an intermediate portion at a leading front side of the damper 26. This provides a bending of inner and outer ends of the damper 26 is the tip end 135 presses in a wedge-like manner into the damper 26, forcing material damper 26 to bulge or flow into the inner and outer pockets 120, 125 to observe energy from firing pulses.

Figure 24:
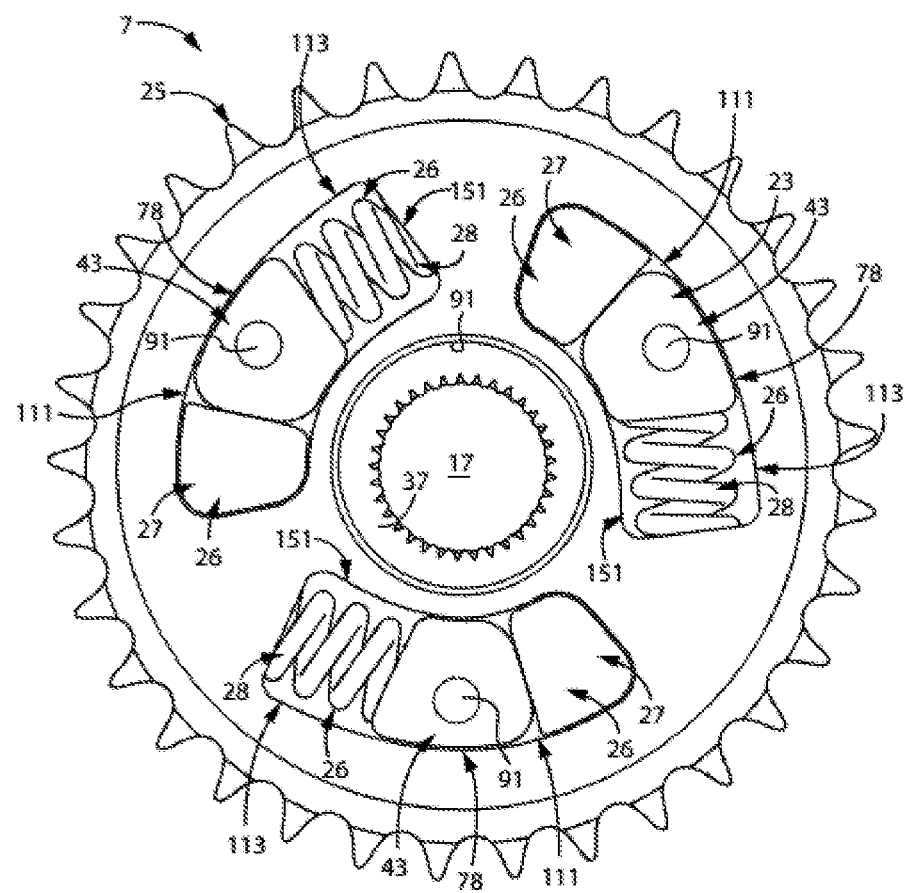
FIG. 24 is a front elevation view of another variant of the damped motorcycle primary drive sprocket system of FIG. 2.
Figure 25:
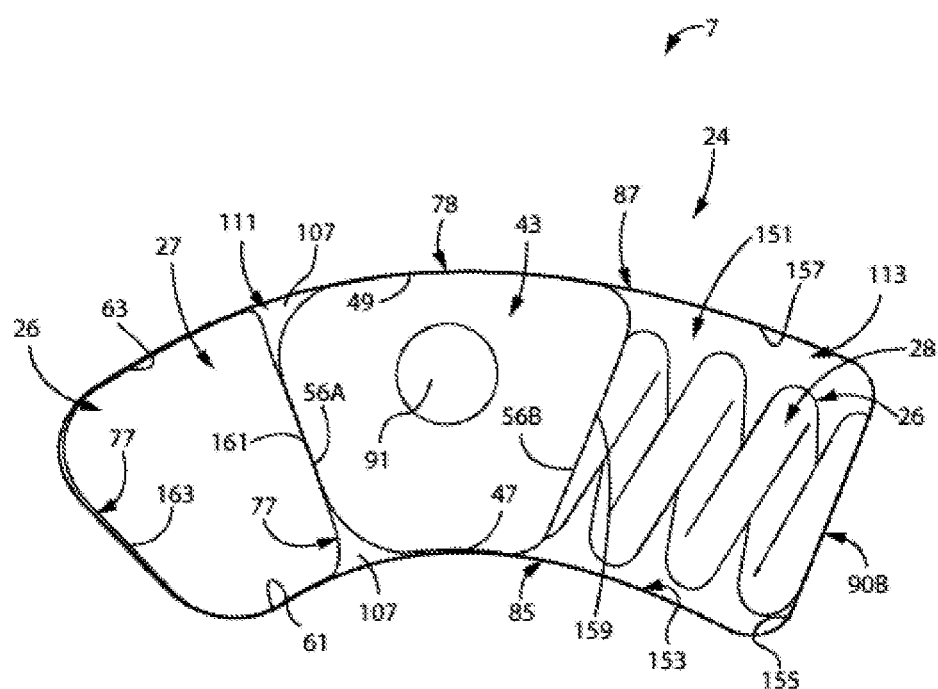
FIG. 25 is a simplified partially schematic view of parts of the system of FIG. 24.

FIGS. 24-25 show a system 7 and components that are mostly identical to the system 7 described with respect to FIGS. 2, 9, and 14 whereby such descriptions are applicable here. The system 7 of FIG. 24 differs from that of FIG. 14 in the following ways. The trailing slot chamber 113 in FIG. 24 extends along a straight line path instead of a curved path that curves continuously and substantially constantly from leading slot chamber 111 as shown in FIG. 14. This way, leading slot chamber 111 is arranged concentrically with respect to the circular sections of sprocket 25, such as central bore 91, and trailing slot chamber 113 is arranged tangentially with respect to the circular sections of sprocket 25, such as central bore 91.

Referring now to FIG. 25, the straight line path of trailing slot chamber 113 defines a substantially rectangular chamber for holding a damper 26, shown here as spring chamber 151. Spring chamber 151 includes spring chamber inner wall 153 defined by a portion of the slot inner wall 85. Spring chamber inner wall 153 extends perpendicularly with respect to spring chamber back wall 155 that is defined by trailing slot end wall 90B. Spring chamber outer wall 157 extends parallel to spring chamber inner wall 153 and perpendicularly with respect to spring chamber back wall 155. Spring chamber outer wall 157 extends along its straight line path distance relatively farther than the straight line path distance of spring chamber inner wall 153. Spring chamber front wall 159 is defined by trailing lug end wall 56B. Spring chamber front wall 159 extends perpendicular to spring chamber inner and outer walls 153, 157 and parallel to spring chamber outer wall 157.

Referring again to FIGS. 24-25, each lug 43 is shown in FIGS. 24-25 as asymmetrical. Referring now to FIG. 25, the leading and trailing lug end walls 56A, 56B extend at different angles with respect to an imaginary line that extends radially through central bore 91 of lug 43 and through a central axis of output shaft 17 (FIG. 24). The trailing lug end wall 56B is at a greater angle with respect to the imaginary line that extends radially through central bore 91 of lug 43, the central axis of output shaft 17 (FIG. 24). The corners at the intersections of the trailing lug end wall 56B and the lug inner and outer walls 47, 49 are sharper than the relatively more rounded or gradually curving corners at the intersections of the leading lug end wall 56A and the lug inner and outer walls 47, 49.

Still referring to FIGS. 24-25, the isolator bushing 27, shown here, has relatively more material at its end wall 77 that engages the lug 43 than the isolator bushing 27 shown in FIG. 14. Referring now to FIG. 25, end walls 77 define a lug-engaging wall shown as isolator bushing trailing wall 161 and a sprocket-engaging wall shown as isolator bushing leading wall 163. The corners at the intersections of the isolator bushing trailing wall 161 isolator bushing inner and outer walls 61, 63 are sharper than the relatively more rounded or gradually curving corners at the intersections of the isolator bushing leading wall 163 and the isolator bushing inner and outer walls 61, 63. Isolator bushing trailing wall 161 extends perpendicularly across substantially the entire width of leading slot chamber 111 of slot 78. At a resting or neutral state of damping system 24, the clearances 107 define perimeter shapes with substantially flat front boundaries provided by respective portions of the isolator bushing trailing wall 161 and curved boundaries provided by respective portions of the corners of the lug 43. Accordingly, most of the volume of the neutral state clearances 107 are overlapped by the lugs 43 or defined between the lugs 43 and the slot inner and outer walls 85, 87.

Referring now to FIG. 25 with further reference to FIGS. 19-21, the operation of damping system 24 of FIG. 25 is mostly identical to that described with respect to FIGS. 19-21, whereby such descriptions are applicable here. Compared to damping system 24 of FIGS. 19-21, in the damping system 24 of FIG. 25, the trailing lug end wall 56B travels along a relatively straighter travel path as guided by the straight spring chamber inner and outer walls 153, 157, and there is relatively more material at the isolator bushing trailing wall 161 to deform, displace, and flow into the clearances 107 during firing pulses of the engine 11 (FIG. 1).

Figure 26:
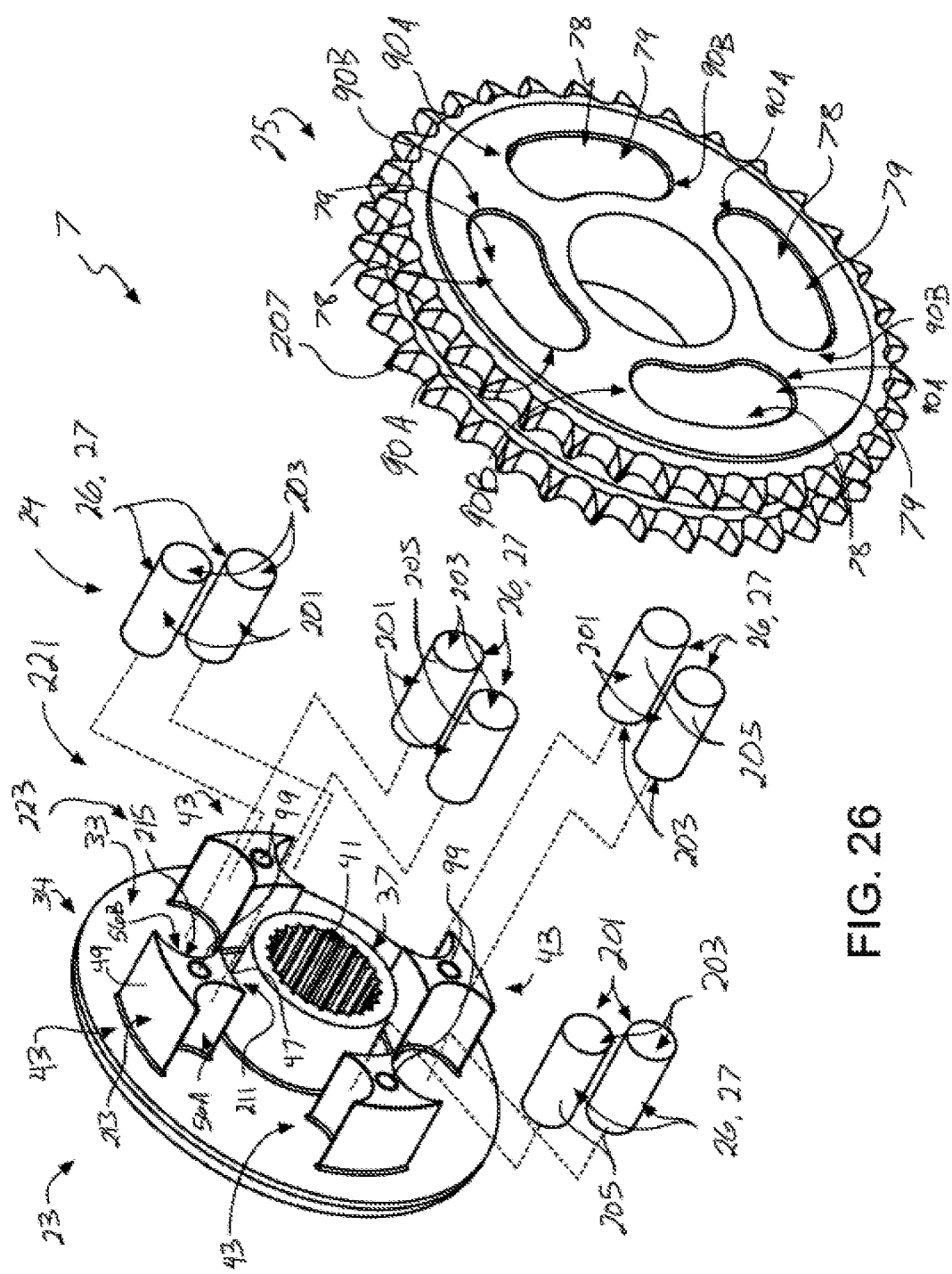
FIG. 26 is an exploded isometric view of a variant of the damped motorcycle primary drive sprocket system of FIG. 2.
Figure 27:
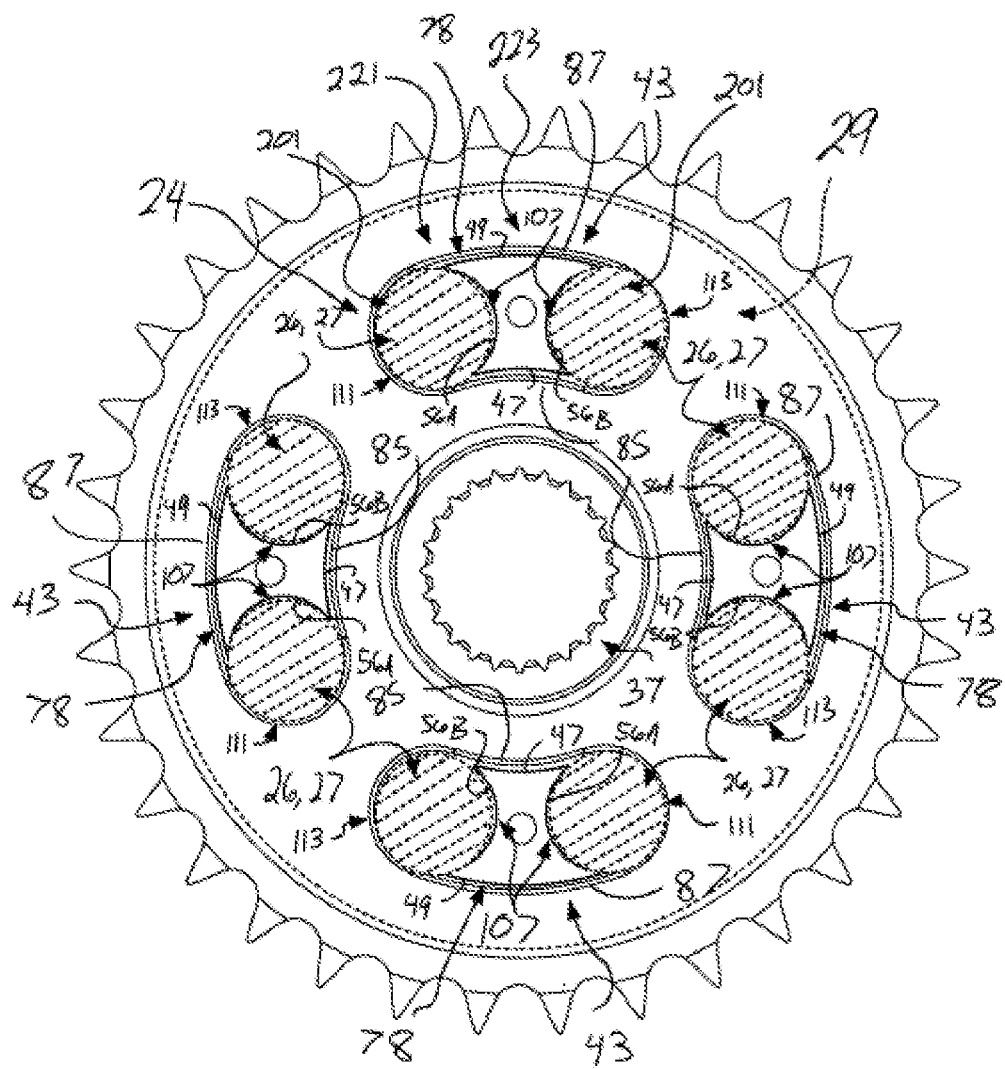
FIG. 27 is a front elevation view of the system of FIG. 26.
Figure 28:
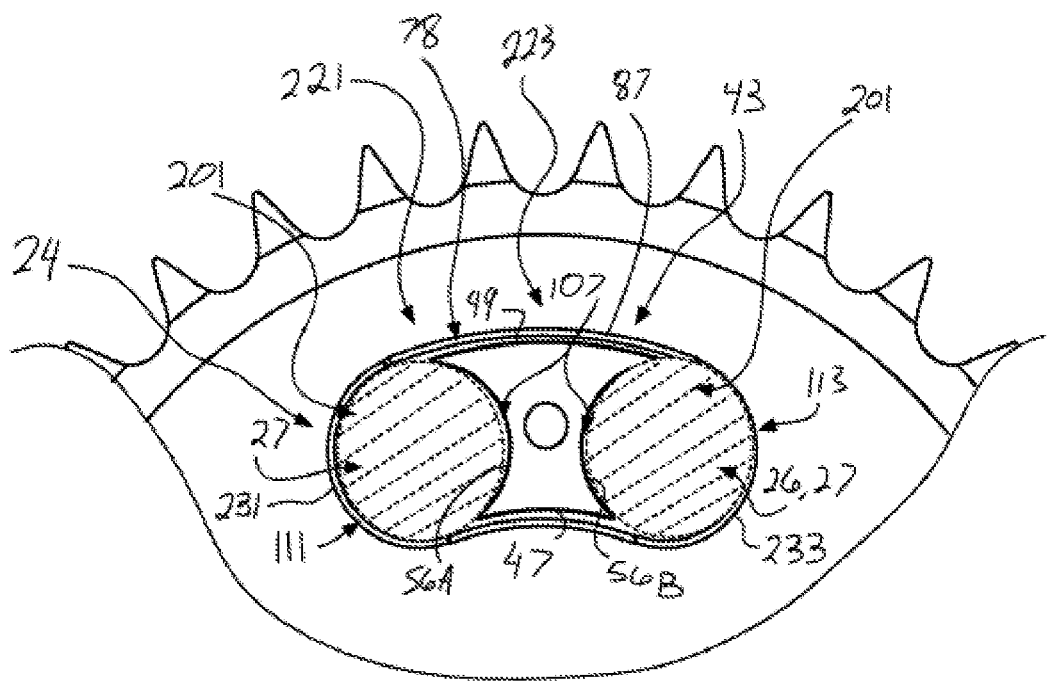
FIG. 28 is an enlarged front elevation view of a portion of the system of FIG. 26.

FIGS. 26-28 show a system 7 and its components that are mostly identical to the system 7 described with respect to FIGS. 2, 9, 14, 22, and 24, whereby such descriptions are applicable here. Referring now to FIG. 26, the system 7 differs from those in FIGS. 14, 22, and 24 in the following ways. Dampers 26 are shown as isolator bushings 27, which are represented as damper segments 201. Damper segments 201 are shown here as discrete damper segments 201 with a pair arranged as leading and trailing damper segments 201 at each sprocket slot 78. The isolator bushings 27 of each pair of damper segments 201 are shown here having identical configurations, including cylindrical bodies 203 with outer circumferential surfaces 205. Isolator bushings 27 are parallel to each other and to the central axis of the hub, sandwiching the respective lug 43 between each pair of bushings 27 within each sprocket slot 78. This allows the rubber or other resilient material of the pairs of isolator bushing 27 to absorb torsional vibrations or otherwise damp impulses such as engine firing pulses in both directions of rotational clocking of the hub 23 and sprocket 25 with respect to each other. Within the sprocket 25, the slots 78 extend into a sprocket inner surface 207 that faces toward the hub 23 and motorcycle engine 11 (FIG. 1), at and at least partially through a thickness dimension of the sprocket 25. Slots 78 are shown here extending through the entire thickness of the sprocket 25 and having the same perimeter shape as those in the sprocket 25 of FIG. 7, with curved leading and trailing slot end walls 90A, 90B.

Still referring to FIG. 26, each lug 43 has a lug inner segment 211 arranged closer to the hub central axis than the rest of the lug 43 and a lug outer segment 213 arranged farther from the hub central axis than the rest of the lug 43. The curved inner and outer lug walls 47, 49 are respectively defined at the inner and outer lug segments 211, 213. A lug waist segment 215 is arranged at a middle or intermediate portion of the lug 43, between the lug inner and outer segments 211, 213. Lug waist segment 215 may be narrower than at least one of the lug inner and outer segments 211, 213 and is shown here narrower than both. Leading and trailing lug end walls 56A, 56B are continuously curved and present concave surfaces respectively facing forward and backward. This presents a configuration with an hourglass-type perimeter shape, with the narrowed lug waist segment 215. Only the top lug 43 is fully labeled, although the labels apply to the other lugs 43 of FIGS. 26-27.

Referring again to FIGS. 26-28, the cooperation of lugs 43 within the slots 78 at least partially defines a coupling system 221 with a lug and slot arrangement 223 that rotationally connects the hub 23 and sprocket 25 to each other while permitting rotational clocking movements of the hub 23 and sprocket 25 with respect to each other during firing pulses of the motorcycle engine 11 (FIG. 1). Referring now to FIG. 27, the limits of the rotational clocking movements of the hub 23 and sprocket 25 with respect to each other correspond to the amount of radial compression permitted by the cylindrical bodies of the isolator bushings 27 within damping system 24 between the hub 23 and sprocket 25, which may include deforming part(s) of the isolator bushing 27 material into clearances 107, shown here between the isolator bushing 27 and cupped or concave leading and trailing wall surfaces of lugs 43. The lug and slot arrangement 223 is shown here with cooperating surfaces or other features of the hub 23 and sprocket 25 that accommodate and guide the rotational clocking while guiding the movement to restrict radial movement to maintain axial alignment of the hub 23 and sprocket 25. The inner and outer lug surfaces that are defined by the lug inner and outer walls 47, 49 face toward inner and outer slot surfaces that are defined by the slot inner and outer walls 85, 85. The inner and outer lug surfaces and corresponding inner and outer slot surfaces are separated from each other by a slight clearance to permit the rotational clocking which maintains coaxial alignment, with the clearances being, for example, about less than about $20/1000$ of an inch or about $10/1000$ of an inch, such as $5/1000$ of an inch radially inside and radially outside the lug 43. This clearance radially locates and maintains axial alignment of the hub 23 and sprocket 25 with respect to each other while permitting the lugs 43 to advance and regress along lengths of the slots 78. This permits the rotational clocking movement of the hub 23 and sprocket 25 with respect to each other during firing pulses of the motorcycle engine while maintaining a fixed axial overall width of the hub 23 and sprocket 25 assemblage.

Referring now to FIG. 28, the lug 43 in each sprocket slot 43 separates the slot into the leading slot chamber 111 facing toward or in a leading position with respect to the direction of rotation of the motorcycle engine output shaft 17 (FIG. 1) and the trailing slot chamber 113 facing away from or in a trailing position with respect to the direction of rotation of the motorcycle engine output shaft 17 (FIG. 1). The illustrated configuration includes a first pair of walls defined by a slot leading end wall 231 and the lug leading end wall 56A that bound the front and back of the leading slot chamber 111 that holds the leading isolator bushing 27. A second pair of walls defined by a slot trailing end wall 233 and the lug trailing end wall 56B bound the front and back of the trailing slot chamber 113 that holds the trailing isolator bushing 27. The leading and trailing slot chambers 111, 113 are shown here with substantially circular perimeter shapes defined by the curved wall segments of the slot and lug leading end walls 231, 56A and the slot and lug trailing end walls 233 and the lug leading end wall 56B. The particular perimeter shapes of the leading and trailing slot chambers 111, 113 dynamically change inversely of each other while the motorcycle engine 11 (FIG. 1), during which time the width dimensions of the leading and trailing slot chambers 111, 113 vary as a function of a particular rotational clocking state of the hub 23 and sprocket 25 with respect to each other depending on which one of the leading and trailing isolator bushings is being compressed or relaxed and to what extent, while the damped motorcycle primary drive sprocket system 7 (FIG. 1) absorbs torsional and/or other vibrations from firing pulses of the motorcycle engine 11 (FIG. 1).

Many changes and modifications could be made to the invention without departing from the spirit thereof. The scope of these changes will become apparent from the appended claims.

What is claimed is:

1. A damped primary drive sprocket system for a motorcycle primary drive connecting a motorcycle engine to a motorcycle transmission, the damped primary drive sprocket system, comprising:
a hub engaging and rotationally driven by an output shaft of a motorcycle engine rotating in a direction of rotation, the hub defining a central axis and having,
a hub base; and
multiple lugs extending, from the hub base, the lugs spaced from each other and arranged parallel to the central axis of the hub;
a sprocket arranged to receive torque from the hub, the sprocket defining a central axis aligned with the central axis of the hub and having, an outer circumferential surface having teeth for driving a chain or belt to transmit torque from the damped primary drive sprocket system to a clutch delivering torque to the motorcycle transmission;
multiple openings defining sprocket slots in the sprocket receiving the multiple lugs of the hub for transmitting torque from the hub to the sprocket, wherein each sprocket slot is separated by a respective lug of the hub into a leading slot chamber facing toward the direction of rotation of the output shaft of the motorcycle engine and a trailing slot chamber facing away from the direction of rotation of the output shaft of the motorcycle engine; and
a damping system transmitting torque between the sprocket and hub while absorbing vibrations and having,
a leading damper segment arranged in each of the leading slot chambers of the sprocket; and
a trailing damper segment arranged in each of the trailing slot chambers of the sprocket;
wherein:
at least one of the leading and trailing damper segments is defined by an isolator bushing with a cylindrical body with an outer circumferential surface; and
at least one of the leading and trailing slot chambers defines a substantially circular perimeter shape defined by curved wall segments when viewed in a transverse cross-section through the damped primary drive sprocket system so that the outer circumferential surface of the isolator bushing cylindrical body engages the curved wall segments of the at least one of the leading and trailing slot chambers.

2. A damped primary drive sprocket system for a motorcycle primary drive connecting a motorcycle engine to a motorcycle transmission, the damped primary drive sprocket system, comprising:
a hub engaging and rotationally driven by an output shaft of a motorcycle engine rotating in a direction of rotation, the hub defining a central axis and having,
a hub base; and
multiple lugs extending from the hub base, the lugs spaced from each other and arranged parallel to the central axis of the hub;
a sprocket arranged to receive torque from the hub, the sprocket defining a central axis aligned with the central axis of the hub and having,
an outer circumferential surface having teeth for driving a chain or belt to transmit torque from the damped primary drive sprocket system to a clutch delivering torque to the motorcycle transmission;
multiple openings defining sprocket slots in the sprocket receiving the multiple lugs of the hub for transmitting torque from the hub to the sprocket, wherein each sprocket slot is separated by a respective lug of the hub into a leading slot chamber facing toward the direction or rotation of the output shaft of the motorcycle engine and a trailing slot chamber facing away from the direction of rotation of the output shaft of the motorcycle engine; and
a damping system transmitting torque between the sprocket and hub while absorbing vibrations and having,
a leading damper segment arranged in each of the leading slot chambers of the sprocket; and
a trailing damper segment arranged in each of the trailing slot chambers of the sprocket;

wherein:
each sprocket slot has a slot leading end wall and a slot trailing end wall in leading and trailing positions with respect to the direction of rotation of the output shaft of the motorcycle engine;
each lug within the corresponding sprocket slot has a lug leading end wall and a lug trailing end wall in leading and trailing positions with respect to the direction of rotation of the output shaft of the motorcycle engine; and
wherein at least one of:
a first pair of walls defined by the slot leading end wall and the lug leading end wall that defines the leading slot chamber; and
a second pair of walls defined by the slot trailing end wall and the lug trailing end wall that defines the trailing slot chamber;
defines a curved opening of the respective leading and trailing slot chambers that receives the corresponding at least one of the leading and trailing damper segments.

3. The damped primary drive sprocket system of claim 2, wherein:
each of the leading and trailing damper segments is defined by an isolator bushing with a cylindrical body; and
each of the leading and trailing slot chambers defines a curved opening that receives the cylindrical body of the isolator bushing.

4. The damped primary drive sprocket system of claim 3, wherein each lug defines:
a lug inner segment arranged relatively closer to the hub central axis;
a lug outer segment arranged relatively farther from the hub central axis; and
a lug waist segment arranged between the lug inner and outer segments, wherein the lug waist segment is narrower than at least one of the lug inner and outer segments.

5. The damped primary drive sprocket system of claim 4, wherein the lug waist segment is narrower than each of the lug inner and outer segments.

6. The damped primary drive sprocket system of claim 5, wherein each of the lug leading and trailing walls is curved to present concave surfaces respectively facing toward and away from the direction of rotation of the output shaft of the motorcycle engine.

7. A damped primary drive sprocket system for a motorcycle primary drive connecting a motorcycle engine to a motorcycle transmission, the damped primary drive sprocket system, comprising:
a hub engaging and rotationally driven by an output shaft of a motorcycle engine rotating, in a direction of rotation,
a sprocket arranged to receive torque from the hub;
a coupling system that defines a lug and slot arrangement that rotationally connects the hub and sprocket to each other and is configured to permit rotational clocking movements of the hub and sprocket with respect to each other during firing pulses of the motorcycle engine;
a damping system arranged between the hub and sprocket and configured to damp the rotational clocking movements of the hub and sprocket with respect to each other during firing pulses of the motorcycle engine;
wherein:
the lug and slot arrangement is defined by lugs that have inner and outer lug surfaces that face toward inner and outer slot surfaces to radially locate and maintain axial alignment of the hub and sprocket with respect to each other while permitting the lugs to advance and regress along lengths of the slots to permit the rotational clocking movement of the hub and sprocket with respect to each other during firing pulses of the motorcycle engine;

the lug and slot arrangement is defined by lugs of the hub that are received in slots of the sprocket;

the hub defines a hub outer surface that faces away from the motorcycle engine and the lugs extends perpendicularly from the hub outer surface away from the motorcycle engine;

the sprocket defines a sprocket inner surface that faces toward the motorcycle engine and the slots of the sprocket extend into the sprocket inner surface and at least partially through a thickness dimension of the sprocket; and the damping system includes a leading damper segment and a trailing damper segment arranged on opposite sides of each lug in each of the slots;

the slot is separated by the respective lug into:
- a leading slot chamber that defines a circular perimeter shape at a front end of the slot relative to the direction of rotation of the output shaft of the motorcycle engine, and
- a trailing slot chamber that defines a circular perimeter shape at a back end of the slot relative to the direction of rotation of the output shaft of the motorcycle engine;

the leading damper segment is defined by a first isolator bushing with a cylindrical body that is arranged in the leading slot chamber; and the trailing damper segment is defined by a second isolator bushing with a cylindrical body that is arranged in the trailing slot chamber.

\* \* \* \* \*